(12) United States Patent
Paris

(10) Patent No.: US 9,043,195 B2
(45) Date of Patent: May 26, 2015

(54) SYSTEMS AND METHODS FOR TEACHING PHONEMIC AWARENESS

(76) Inventor: Jaclyn Paris, Bel Air, MD (US)

( * ) Notice: Subject to any disclaimer, the term of this patent is extended or adjusted under 35 U.S.C. 154(b) by 912 days.

(21) Appl. No.: 13/244,993

(22) Filed: Sep. 26, 2011

(65) Prior Publication Data

US 2013/0080151 A1     Mar. 28, 2013

(51) Int. Cl.
    *G09B 19/04*      (2006.01)
    *G09B 17/00*      (2006.01)

(52) U.S. Cl.
    CPC ............... *G09B 19/04* (2013.01); *G09B 17/00* (2013.01)

(58) Field of Classification Search
    CPC ........... G09B 19/04; G09B 19/06; G09B 5/06
    USPC .................................................. 434/167, 178
    See application file for complete search history.

(56) References Cited

U.S. PATENT DOCUMENTS

| | | |
|---|---|---|
| 683,267 A | 9/1901 | Froelich |
| 1,230,263 A | 6/1917 | Alexander |
| 1,286,631 A | 12/1918 | Hillyard |
| 1,428,456 A | 9/1922 | Stranders |
| 1,732,980 A | 10/1929 | Mooney |
| 2,072,605 A | 3/1937 | Palmer |
| 2,091,555 A | 8/1937 | Messinger |
| 2,483,833 A | 10/1949 | Levin |
| 2,982,032 A | 5/1961 | Cooke |
| 3,016,243 A | 1/1962 | Irwin |
| 3,245,687 A | 4/1966 | Irwin |
| 3,422,549 A | 1/1969 | Grangaard |
| 3,426,451 A | 2/1969 | Hoffmann |
| 3,464,124 A | 9/1969 | Lynd |
| 3,571,951 A | 3/1971 | Siegel |
| 3,654,712 A | 4/1972 | Bagdasar |
| 3,670,427 A | 6/1972 | Stolpen |
| 3,715,812 A | 2/1973 | Novak |
| 3,744,154 A | 7/1973 | Pott |
| 3,798,792 A | 3/1974 | Askew |

(Continued)

FOREIGN PATENT DOCUMENTS

JP      2007322951 A      12/2007

OTHER PUBLICATIONS

Reithaug, "Orchestrating Success in Reading", [online], 2002.*

(Continued)

*Primary Examiner* — Jialong He
(74) *Attorney, Agent, or Firm* — August Law, LLC; George Willinghan

(57) ABSTRACT

A system to teach phonemic awareness uses a plurality of phonemes and a plurality of graphemes. Each phoneme is a unique sound and an indivisible unit of sound in a spoken language, and each grapheme is a written representation of one of the plurality of phonemes. A plurality of distinct graphical images and a plurality of unique names are provided where each unique name is associated with one of the graphical images and represents a grouping of graphemes selected from the plurality of graphemes. The system uses a plurality of sets of display pieces having a plurality of individual display pieces. Each individual display piece includes at least a portion of one of the graphical images and the graphemes from the grouping of graphemes constituting the associated unique name. A predefined instructional environment defines a predefined spatial context and predefined rules governing the acquisition and utilization of individual display pieces.

38 Claims, 13 Drawing Sheets

(56) References Cited

U.S. PATENT DOCUMENTS

| | | | |
|---|---|---|---|
| 4,007,548 A | 2/1977 | Cytanovich | |
| 4,082,279 A | 4/1978 | McFadden | |
| 4,115,932 A | 9/1978 | Charlesworth | |
| 4,140,320 A | 2/1979 | Cortimilia | |
| 4,158,921 A | 6/1979 | Stolpen | |
| 4,262,431 A | 4/1981 | Darnell | |
| 4,443,199 A | 4/1984 | Sakai | |
| 4,491,326 A | 1/1985 | Halsey | |
| 4,601,473 A | 7/1986 | Dubren et al. | |
| 4,613,309 A | 9/1986 | McCloskey | |
| 4,684,135 A | 8/1987 | Bouchal | |
| 4,713,008 A * | 12/1987 | Stocker et al. | 434/167 |
| 4,799,680 A | 1/1989 | Weimar | |
| 4,826,175 A | 5/1989 | Quatrino | |
| 5,057,020 A | 10/1991 | Cytanovich | |
| 5,108,113 A | 4/1992 | Leach | |
| 5,306,153 A | 4/1994 | Foster | |
| 5,417,432 A | 5/1995 | Dwyer | |
| 5,429,513 A * | 7/1995 | Diaz-Plaza | 434/167 |
| 5,511,980 A | 4/1996 | Wood | |
| 5,575,658 A | 11/1996 | Barnard | |
| 5,615,886 A | 4/1997 | Chalfin | |
| 5,769,418 A | 6/1998 | Gilbert | |
| 5,772,212 A | 6/1998 | Hagedorn | |
| 5,788,503 A | 8/1998 | Shapiro et al. | |
| 5,800,176 A | 9/1998 | Harrison | |
| 5,863,043 A | 1/1999 | Bitner | |
| 5,863,204 A | 1/1999 | Fulton | |
| 5,906,492 A | 5/1999 | Putterman | |
| 6,062,864 A | 5/2000 | Rood | |
| 6,077,080 A | 6/2000 | Rai | |
| 6,126,447 A | 10/2000 | Engelbrite | |
| 6,322,367 B1 | 11/2001 | Marshall | |
| 6,412,779 B1 | 7/2002 | Kenney | |
| 6,474,992 B2 | 11/2002 | Marshall | |
| 6,491,524 B2 | 12/2002 | Bender | |
| 6,500,007 B2 | 12/2002 | Pupulin | |
| 6,517,407 B1 | 2/2003 | Peters | |
| 6,685,477 B1 | 2/2004 | Goldman et al. | |
| 6,761,354 B2 | 7/2004 | Pavlovits | |
| 6,869,286 B2 | 3/2005 | Furry | |
| 6,884,075 B1 | 4/2005 | Tropoloc | |
| 6,951,464 B2 | 10/2005 | Cubeta et al. | |
| 7,011,525 B2 | 3/2006 | Mejia | |
| 7,018,210 B2 | 3/2006 | Goldman et al. | |
| 7,080,983 B2 | 7/2006 | Barker | |
| 7,104,798 B2 | 9/2006 | Spaventa | |
| 7,151,541 B2 | 12/2006 | Seder | |
| 7,172,427 B2 | 2/2007 | Kaul | |
| 7,220,125 B1 | 5/2007 | Blansett | |
| 7,427,068 B2 | 9/2008 | Middleton | |
| 7,438,555 B2 | 10/2008 | Ungar | |
| 7,484,732 B2 | 2/2009 | Adams | |
| 7,579,061 B2 | 8/2009 | Dronzek | |
| 7,631,873 B2 | 12/2009 | Scriven | |
| 2003/0046082 A1 * | 3/2003 | Siegel | 704/270 |
| 2005/0037322 A1 * | 2/2005 | Kaul | 434/185 |
| 2005/0042583 A1 * | 2/2005 | Barker | 434/159 |
| 2006/0040242 A1 | 2/2006 | Mejia | |
| 2006/0141424 A1 | 6/2006 | Bockol et al. | |
| 2006/0166173 A1 * | 7/2006 | Ellis et al. | 434/185 |
| 2007/0105074 A1 | 5/2007 | Maslen | |
| 2008/0187892 A1 * | 8/2008 | Lancaster | 434/178 |
| 2008/0206724 A1 * | 8/2008 | Volden | 434/178 |
| 2009/0068625 A1 * | 3/2009 | Petro et al. | 434/160 |
| 2009/0087820 A1 | 4/2009 | Chandless | |
| 2010/0068683 A1 | 3/2010 | Panec et al. | |

OTHER PUBLICATIONS

Draper, "Thinking spelling", [online], 2008.*

Alphabet Sequencing Puzzles Game, http://www.lakeshorelearning.com/product/productDet.jsp;jsessionid=T7jVHxCCCM7THBd4gCy911JJrd550JnbhjggnLGL1VTS7NGnSFBd!20760588651101518 4598?productItemID=1%2C689%2C949%2C371%2C920%2C722 &ASSORTMENT%3C%3East_id=1408474395181113 &bmUID=1316709365578, Sep. 22, 2011.

Purple Pebble Games E-Z as ABC Game, http://www.amazon.com/Purple-Pebble-Games-ABC-Game/dp/B000BXKRGS, Sep. 22, 2011.

Sound Hounds Game, http://www.amazon.com/Trend-SOUND-HOUNDS-EDUCATIONAL-GAME/dp/B001JTMJ50/ref=sr_1_ 1?s=toys-and-games&ie=UTF8&qid=1316712899&sr=1-1, Sep. 22, 2011.

Spell a Puzzle Game, http://www.amazon.com/Educa-10159-Spell-Puzzle-Game/dp/B00004YT11/ref=cm_cr_pr_product_top, Sep. 22, 2011.

National Institute for Literacy, Put Reading First, http://lincs.ed.gov/publications/pdf/PRFbooklet.pdf,2006.

Yopp, Hallie Kay & Yopp, Ruth Helen, Phonological Awareness is Child's Play!, http://www.naeyc.org/files/yc/file/200901/BTJPhonologicalAwareness.pdf, 2009.

* cited by examiner

SYSTEMS AND METHODS FOR TEACHING PHONEMIC AWARENESS

FIELD OF THE INVENTION

The present invention, relates to phonics and phonemic awareness.

BACKGROUND OF THE INVENTION

Phonological awareness refers to the ability to understand and to manipulate the sound structure in a language. It covers the sound structure of spoken words and is separate from the actual meaning of those words. Children and students develop phonological awareness as they study and learn a spoken language. Phonological awareness includes syllable awareness and onset-rime awareness. The smallest unit of speech and the most difficult aspect of phonological awareness is phonemic awareness. Phonemes are the individual sounds in speech. Different spoken languages use different numbers of phonemes from a low of 10 phonemes up to 140 phonemes. English has about 44 phonemes, and Spanish has about 24 phonemes. Phonemic awareness refers to the ability of a child or student to think about and to manipulate these sounds. Typically, this is the last and deepest understanding of spoken language acquired by children and students.

Not all students develop phonological awareness and phonemic awareness, which is a component of phonological awareness, easily or at the same rate. Many different methods have been developed to aid children and students in developing phonological awareness. However, many of these systems do not focus on phonemic awareness in particular. In addition, these methods are not provided in a method that is enjoyable to the students or that leverages the inherent desire of children and students to participate in games or in social networking opportunities. Therefore, methods and systems are needed that focus on teaching phonemic awareness to children and students in an environment that captures an inherent desire to play games and to interact in groups.

SUMMARY OF THE INVENTION

The present invention is directed to methods and systems for teaching phonemic awareness. In one embodiment, an exemplary embodiment of a system for teaching phonemic awareness in accordance with the present invention includes a plurality of phonemes and a plurality of graphemes. Each phoneme represents a unique sound and an indivisible unit of sound in a spoken language. In one embodiment, the plurality of phonemes includes forty four phonemes. In one embodiment, each grapheme is a written representation of one of the plurality of phonemes. In one embodiment, at least two of the plurality of graphemes in combination are a written representation of a single phoneme. In another embodiment, at least one of the plurality of phonemes is represented separately by at least two of the plurality of graphemes. In one embodiment, each individual grapheme includes one or more predefined visual indicators selected to provide a visual association of the phonemes associated with those graphemes. Suitable visual indicators include, but are not limited to graphics, unique colors and combinations thereof.

The system also includes a plurality of distinct graphical images and a plurality of unique names. Each unique name is associated with one of the graphical images and is constructed from a grouping of graphemes selected from the plurality of graphemes. In one embodiment, each unique name is a single syllable word. Alternatively, at least one unique name is a multisyllabic word.

The system includes a plurality of sets of display pieces. Each set of display pieces includes a plurality of individual display pieces, and each individual display piece contains at least a portion of one of the graphical images and one or more graphemes from the grouping of graphemes constituting the unique name associated with that graphical image. In one embodiment, each individual display piece in a given set of display pieces has an alpha-numeric designation that is common to all display pieces within that set of display pieces. Suitable alpha-numeric designations include an ordered sequence. In one embodiment, each portion of one of the graphical images on each individual display piece within a given set of display pieces includes an additional graphical representation of the unique name associated with that graphical image. In addition, each individual display piece includes one or more predefined visual indicators selected to provide a visual association to the phonemes associated with the graphemes appearing on that individual display piece. Suitable visual indicators include, but are not limited to graphics, unique colors and combinations thereof. In one embodiment, each set of display pieces is a set of game pieces having a plurality of individual game pieces. Suitable individual game pieces include playing cards.

In one embodiment, each individual display piece is a partial image display piece, and each partial image display piece includes a unique portion of the graphical image associated with the set of display pieces containing that individual display piece and at least one of the graphemes constituting the unique name associated with that graphical image. In one embodiment, each partial image display piece includes exactly one grapheme. Alternatively, each partial image display piece includes a unique portion of the graphical image. In one embodiment, all partial image display pieces within the set of display pieces are configured to form the graphical image and unique name when grouped together. In another embodiment, each partial image display piece is a playing card having an opaque section containing its unique portion of the graphical image and graphemes. In one embodiment, each partial image display piece includes a transparent section. All partial image display pieces within the given set of display pieces are configured such that the opaque section of each partial image display piece aligns with the transparent section of all other partial image display pieces when the partial image display pieces are grouped together in any order.

In one embodiment, all partial image display pieces include an additional opaque section, and all of the additional opaque sections represent an identical section. In one embodiment, the additional opaque section is a black section. All additional opaque sections align when the partial image display pieces are grouped together. In one embodiment, each set of display pieces includes a single full image display piece. Each full image display piece has a complete representation of the graphical image associated with that set of display pieces and all graphemes constituting the unique name associated with the graphical image. In one embodiment, each full image display piece includes a plurality of sections. Each section contains a unique portion of the graphical image associated with that set of display pieces and at least one of the graphemes constituting the unique name associated with that graphical image. In one embodiment, each section comprises exactly one grapheme.

The system of the present invention also includes a predefined instructional environment. This instructional environment is a predefined spatial context and predefined rules governing the acquisition and utilization of individual display pieces within the predefined spatial context. In one embodiment, the pre-defined instructional environment is a gaming environment, and each graphical image is a fictional character within the gaming environment. The gaming environment includes the predefined rules governing fictional character creation, fictional character acquisition, fictional character utilization, fictional character interactions, fictional character personality, physical character stance, and fictional character disposition within the predefined spatial context of the gaming environment. In one embodiment, each fictional character includes at least one unique functionality that can be expressed or utilized within the predefined rules of the gaming environment.

In one embodiment, the spatial context includes a plurality of distinct display piece collections. Each display piece collection contains a plurality of individual display pieces such that the entire plurality of sets of display pieces are contained within the plurality of display piece collections. In addition, the predefined rules include rules for acquisition of the display pieces from the distinct display piece collections. In one embodiment, the spatial context is a fictional universe. The plurality of distinct display piece collections represent a plurality of planets in the fictional universe, and the predefined rules are rules for moving between planets in the fictional universe, locating individual display pieces on each planet and assembling individual display pieces into the sets of display pieces. In one embodiment, the individual display pieces are individual playing cards. In one embodiment, each distinct display piece collection is a unique grouping of individual display pieces. In another embodiment, each distinct display piece collection includes individual display pieces representing a common phoneme. In one embodiment, individual display pieces of each given set of display pieces are all grouped together in one of the plurality of display piece collections. In another embodiment, each distinct display piece collection is associated with one of a plurality of syllable types. Each syllable type representing a category of vowel sound associated with at least one syllable in one of the unique names associated with one of the graphical images.

In one embodiment, each distinct playing piece collection includes all display pieces in a set of display pieces having an associated given name containing the syllable type associated with the category of vowel sound for that distinct playing piece collection. Suitable syllable types include, but are not limited to, closed syllables, open syllables, vowel-consonant-E syllables, vowel team syllables, r-controlled syllables and consonant-le syllables.

DETAILED DESCRIPTION

Figure 1:
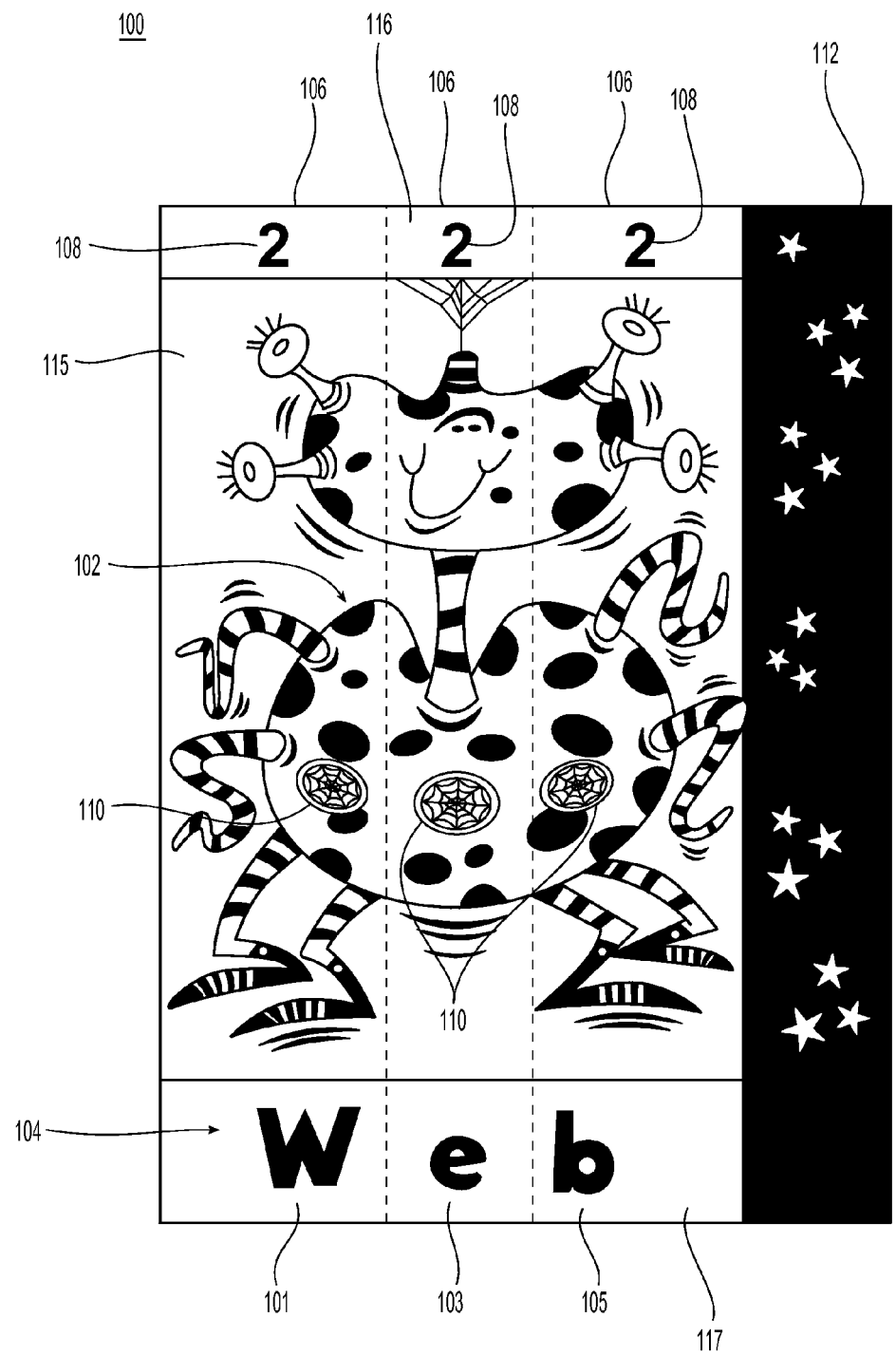
FIG. 1 is a view of the front of an embodiment of a full image display piece for use in the system for teaching phonemic awareness of the present invention.

Exemplary embodiments in accordance with the present invention are directed to systems and methods for teaching phonological awareness in a sequenced and scaffolding system that is preferably game-themed. As used herein, phonological awareness refers to the ability of a person or a student to attend to and to manipulate units of speech in sound independent of the meaning of those speech units. These units include syllables that are constructed from rimes, which are the vowels and any sounds that follow the vowels in a given syllable, and from onsets, which are the first letters in a syllable or the consonant sounds that precede the vowels in the syllable(s). Also included are the phonemes, which are the smallest sounds in speech or the individual sounds in spoken language. The English language, for example, contains 44 phonemes. The present invention, however, is not limited to use with the English language and can be used to teach phonological awareness in other spoken and written languages. The phonemes heard in the spoken language are expressed in the written language using graphemes.

The game-themed aspects of the claimed invention leverage a natural desire to participate in games found generally in individuals and particularly in children. These games include physical games such as card games and board games as well as electronic, computer or web-based games. These computer-based games can be played on any game specific or general purpose computer including desktop computers, laptop computers and tablets and portable computing devices such as personal digital assistants and smartphones. These computers can utilize touch screens. The natural desire to participate in games includes the desire for social networking and communicating with other game participants in order to establish oneself within the community of the game. In addition to being face-to-face, social networking and communication take place in a virtual gaming and learning environment created and presented in a network-based computer environment. Therefore, social networking is integrated with learning in the game-themed environment.

The system for teaching phonemic awareness of the present invention uses words, including actual words and made-up or nonsense words, in combination with characters that operate within a fictional context, e.g., a world or universe, that is arranged or divided according to the various aspects of phonological awareness that are being introduced and reinforced. The characters have associated and enumerated powers and in combination with their associated words are assembled from a plurality of playing pieces. In one embodiment, these playing pieces are playing cards. Each playing piece contains at least a portion of one of the characters and a segment of a word or name assigned to that character. Each portion of a given name contains one or more graphemes that represent at least one, and preferably only one, phoneme. Participants, players or students move through the fictional context in accordance with a set of prescribed rules to locate and to accumulate playing pieces. These playing pieces are assembled or grouped together to construct characters and the words or names associated with these characters. As each character is constructed, the player obtains the specific enumerated power or powers associated with that character, and these powers can be subsequently used within the gaming environment to locate, obtain and assemble additional characters. An understanding of phonics and phonemes is required to locate, to acquire and to assemble the playing pieces containing the characters and their names. Using the characters and graphics, e.g., pictures, facilitates success by the participants, players and students in learning the names of the characters, and matching the pictures even without initially understanding the letters or graphemes. Initial matching of the characters and graphics ultimately leads to learning letter names and the associated sounds among other facets of phonemic awareness.

In one embodiment, the systems and methods of the present invention are provided as an electronic or computer-based system that can be played in a network-based environment such as the Internet or World Wide Web. Suitable environments include, but are not limited to, multi-player on-line games and first person video or action games. The computer-based system can be arranged as a dedicated hard-programmed gaming system, an executable software program for execution on either a dedicated gaming system or a general purpose system computer system or as a distributed, web-based application. Embodiments of the phonemic awareness and teaching system of the present invention can be presented as a physical game system only, e.g., a card game, as a computer-based system only or as both a physical game system and a computer-based system. Using the computer-based system in conjunction with or as a compliment to the physical game system extends and enhances the exposure of students to the learning opportunities presented by the system of the present invention as students are already predisposed to participate in web-based games outside of a traditional learning or schooling environments. For example, a student can use the physical game system in a traditional school setting under the direct instruction and supervision of a teacher or tutor, and the lessons introduced during school are reinforced at home by the student logging onto a school-sponsored web-based interface to continue the same game. Alternatively, either the network-based interface or the physical game can be used in both the school and the home environment. In addition to game-based contexts, the characters can be introduced in a story-based or thematic context. These story-based contexts can be utilized just like the game-based contexts.

Exemplary embodiments of the systems and methods for teaching phonemic awareness in accordance with the present invention are sequenced to be targeted to different ages, learning abilities, phonemes and syllable patterns. Sequencing allows for phonemic awareness to be taught in a desired sequence to the students or game participants. The words assigned to the graphical images that appear on the playing pieces are broken down or divided based on the phonemes contained in those words, and each word can be broken into either a subset of the total number of phonemes contained within that word or into all of the phonemes contained within that word depending on the age, skill or a combination of the age and skill of the game participants. Varying how words are divided facilitates the targeting of specific phonemes within given words. Additional complexity is achieved in the system of the present invention by adding new words and the associated playing pieces. By making the system a scaffolding system, success with a given word leads to more building and decoding skills and a progression of phonological awareness/phonics.

In accordance with one exemplary embodiment, the present invention is directed to a system for teaching phonemic awareness. This system includes a plurality of phonemes and a plurality of graphemes. Each phoneme represents a unique sound in a given spoken language and an indivisible unit of sound in that spoken language. In one embodiment, the spoken language is English. The total number of phonemes in the plurality of phonemes varies based on the spoken language. In English, the plurality of phonemes represents about forty four phonemes. These phonemes include vowel phonemes and consonant phonemes. These phonemes are represented, for example, in Table 1.

TABLE 1

PHONEMES IN ENGLISH LANGUAGE

| Vowel Phonemes | | Consonant Phonemes | |
|---|---|---|---|
| Phoneme | Example | Phoneme | Example |
| a | Cat | b | baby |
| e | Peg | d | dog |
| i | Pig | f | field |
| o | Log | g | game |
| u | Plug | h | hat |
| ae | Pain | j | judge |
| ee | Sweet | k | cook |
| ie | Tried | l | lamb |
| oe | Road | m | monkey |
| ue | Moon | n | nut |
| oo | Look | p | paper |
| ar | Cart | r | rabbit |
| ur | Burn | s | sun |
| or | Torn | t | tap |
| au | Haul | v | van |
| er | Sister | w | was |
| ow | Down | wh | where |
| oi | Coin | y | yes |
| air | Stairs | z | zebra |
| Ear | Fear | th | then |
| | | th | thin |
| | | ch | chip |
| | | sh | ship |
| | | zh | treasure |
| | | ng | ring |

The phonemes are part of the spoken language. However, a written, graphical and alpha-numeric representation of each phoneme, either alone or in combination is used in the system of the present invention. These written, graphical and alpha-numeric designations are represented by the plurality of graphemes. Each grapheme is a written representation of one of the plurality of phonemes. In one embodiment, a one-to-one correspondence is provided between the graphemes and the phonemes. Therefore, each phoneme is represented by a single unique grapheme. Alternatively, more than one unique grapheme can be associated with a single phoneme. In addition, a single grapheme can be used to illustrate more than one phoneme, either alone or in combination with other graphemes. In one embodiment, at least two of the plurality of graphemes provide the written representation of a single phoneme. In another embodiment, at least one of the plurality of phonemes is represented by two or more of the plurality of graphemes.

The system of the present invention also includes a plurality of distinct graphical images. The distinct graphical images are selected to aid in teaching phonemic awareness by attracting and holding the attention of the participant or student using the system. Suitable graphical images, therefore, appeal to the target audience of the system. These graphical images include graphical representations of humans, animals, machines, automobiles, trains, planes, cartoon characters, still life or any other object representing or derived from real life. In addition, fictional characters can be used. These fictional characters can have cartoonish qualities that are attractive to children. The graphical images can include graphics, alphanumeric designations and colors that appeal to the student or user of the system.

A plurality of unique names is also included in the system for teaching phonemic awareness of the present invention. Each unique name can be a single syllable word. In one embodiment, at least one unique name is a multisyllabic word. These names can be words selected from the written representation of the spoken language for which phonemic awareness is being taught, proper nouns, creative or fanciful names and made-up or nonsensical words. In general, each one of the plurality of unique names are created using one or more of the plurality of graphemes associated with the plurality of phonemes. Therefore, each unique name represents a grouping of graphemes selected from the plurality of graphemes. The unique names are used to embody the phonemes that are being taught by the system of the present invention. In addition, the unique names are selected or created to describe the graphical images of the system. In one embodiment, each unique name in the plurality of unique names is associated with one of the plurality of graphical images. Thus, each graphical image has an associated unique name embodying a grouping of phonemes that the system of the present invention is teaching to a student or other user of the system. This connects the phonemes with a graphical image such as a cartoon character that is desirable or attractive to the student or system user. The system then leverages the accumulation and use of these desirable characters to teach the connected phonemes. This entices the student or system user to understand or to learn the phonemes. In addition, the student or system user is self-motivated to continue using the system to accumulate the graphical images points and powers to learn the associated phonemes.

The graphical images and associated unique names are combined together in an environment that can be viewed and manipulated by the student or system user. In one embodiment, the present invention uses a plurality of sets of display pieces where each set of display pieces includes a given combination of one of the graphical images and the unique name associated with that graphical image. Each set of display pieces contains a plurality of individual display pieces. The number of individual display pieces in each set of display pieces is at least two. Larger numbers of individual display pieces can also be used. In one embodiment, the number of display pieces in a given set of display pieces equals the number of letters, graphemes or phonemes in the unique name assigned to the graphical image associated with the set of display pieces. In one embodiment each set of display pieces includes three or four individual display pieces. Each individual display piece in a given set of display pieces includes at least a portion of one of the graphical images and one or more graphemes from the grouping of graphemes constituting the unique name associated with that graphical image.

In one embodiment, each set of display pieces is a set of game pieces. Suitable game pieces include playing cards where each individual display piece is an individual playing card. In one embodiment, each playing card is generally rectangular in shape with a size of a typical playing card. For example, this size can be about 3.5" by about 2.5", although larger and smaller cards can be used. Suitable materials for the cards include paper, cardboard, plastics and combinations therefore. In one embodiment, the playing cards are configured to be attached to rings or other binding devices to be grouped together and carried. This facilitates the use of the playing cards in a card trading type game.

In one exemplary embodiment, for example, a set of playing cards is used that includes cards such that the entire set of playing cards include every consonant, five short vowels, five long vowels, and four vowel combined vowels. These different letters and graphemes are each contained on one or more cards within the deck and are arranged within the sections on full image display cards and partial image display cards as disclosed herein. In addition, graphical representations of the cards can be used in a computer-based version of the system. In the computer-based version of the system, the display pieces can be two-dimensional and three-dimensional representations of the graphical images. In addition, the graphical images can be animated within a computer-based graphical environment so as to be capable of movement.

Referring to FIG. 1, an exemplary embodiment of an individual display piece 100 arranged as a playing card is illustrated. As illustrated, the individual display piece 100 is a full image display piece. Each set of display pieces includes a single full image display piece. Each full image display piece includes a complete representation of the graphical image 102 associated with that set of display pieces. In addition, the full image display piece includes all of the graphemes constituting the unique name 104 associated with the graphical image 102. As illustrated, the graphical image is a cartoon representation of a spider, and the associated unique name is Web, which is a word associated with spiders. The graphical representation includes multiple eyes, eight legs and a spider web, which are all qualities associated with spiders. The unique name, Web, is a single syllable word constructed from a grouping of the phonemes "w" 101, "e" 103 and "b" 105.

The full image display piece includes a plurality of distinct sections 106. As illustrated, the full image display piece includes three distinct sections. Dashed lines are provided as visual aids in illustrating the different sections. Preferably, these dashed lines are not included on the full image display piece. The graphical image and plurality of sections are arranged on the display piece such that each section includes a unique and non-overlapping portion of the graphical image associated with the set of display pieces containing that full image display piece. Therefore, no two sections comprise an identical portion of the graphical image. In addition, each section includes at least one of the graphemes constituting the unique name 104 associated with that graphical image 102. As illustrated, each section contains exactly one of the graphemes. In one embodiment, each full image display piece 100 also includes at least one additional section 112. In one embodiment, this additional section 112 is used as a place holder for the grapheme associated with silent "e". The silent "e" grapheme is included within additional sections on full image display pieces that are contained in sets of display pieces having associated unique names containing a silent "e". In one embodiment, the graphics in each additional section 112 are common to all display pieces in all sets of display pieces. These common graphics include, for example, a black background and stars or other night-themed graphics.

In one embodiment, the additional section 112 includes the syllable type Consonant "le". For example, a full image display piece containing three distinct sections, corresponding to three overlapping partial image display pieces, with the additional section includes a closed syllable and Consonant "le" into 1 character. This embodiment facilitates the use of unique names that are multisyllabic words. For example, the words Bubble and Candle can be associated with a graphical image divided into three sections with an additional section for the Consonant "le" as follows:

| Bubble | B | u | b | ble |
| Candle | C | a | n | dle |

In one embodiment, the additional section can be used for unique names that are Consonant "le" words that do not double the consonant as illustrated, for example, in the word Fable.

| Fable | F | a | b | le |

Preferably, however, Consonant "le" words are used that double the consonant ahead of the "le" to avoid an open syllable alone, as the third column consonant should make that vowel short. However, the /a/ would be colored blue with the sun behind it indicating it is to be pronounced long.

In one embodiment, graphical images are used with unique names that contain Open Syllable or Closed Syllable and that end in R-Controlled syllables. In this embodiment, the "er" is located in the additional section, which is the fourth section. In one embodiment, an open syllable is combined with another syllable as illustrated in the words Tiger and Panther.

| Tiger | T | i | g | er |
| Panther | P | a | nth | er |

However, the /i/ would be colored blue with the sun behind it indicating it is to be pronounced long.

Unique names that are words ending in "y", "ment", "tion", "ture" or other suffixes and prefixes are also used as illustrated in the words Party, Fragment, Fraction and Venture.

| Party | P | ar | t | y |
| Fragment | Fr | a | g | ment |
| Fraction | Fr | a | c | tion |
| Venture | V | e | n | ture |

In general, unique names are selected for the graphical images to be compatible with the format of the sections on the display pieces. For example, unique names Silent "e" and the suffix "ment" together are preferably not used as illustrated, for example in the word Pavement.

| Pavement | P | a | v | ement |

However, these words could be used with further divisions within the additional section. For example, the "e" is colored in water as it is silent, and the "ment" is not.

In one embodiment, each individual display piece within a given set of display pieces and each section on the full image display piece includes an alpha-numeric designation 108 that is common to all display pieces within that set of display pieces. In addition, each set of display pieces is assigned a unique alpha-numeric designation. This unique alpha-numeric designation is used to associate and to group all display pieces in a given set of display pieces. This aids in the accumulation and assembly of related display pieces and in the sequencing of sets of display pieces. As illustrated, the alpha-numeric designation is a number. Assigning unique, sequential numbers to the sets of display pieces facilitates sequencing of phoneme awareness teaching using the system of the present invention. Therefore, numbers are assigned to sets of display pieces in accordance with a desired sequence of teaching the phonemes contained in the unique names associated with the sets of display pieces. In one embodiment, this desired sequence is configured, for example, in order of increasing difficulty or complexity. In one embodiment, numbering is used to introduce letters in the sequence of short vowels first. The consonants are preferably introduced in no special order other than that they fit in well with the short vowel names. Numbering the sets of display pieces assigns an ordered sequence to all of the sets of display pieces, and the sets of display pieces are then accumulated and assembled in accordance with this ordered sequence.

In one embodiment, each portion of the graphical image contained in one of the sections of the full image display piece includes an additional graphical representation 110 of the unique name associated with that graphical image. As illustrated in FIG. 1, for example, an additional graphical representation of a spider web is included within each section of the graphical image. In one embodiment, each individual display piece also includes one or more predefined visual indicators selected to provide a visual association between the displayed graphemes and their associated phonemes. These visual indicators provide visual cues to the system user or student. These visual cues include the type of associated phoneme, e.g., vowel or consonant, whether the phoneme is hard or soft or whether the phoneme is voiced or silent. Suitable visual indicators include, but are not limited to, graphics, unique colors and combinations thereof. These visual indicators are provided in the background of each grapheme or in the font or style of each grapheme. In one embodiment, each individual grapheme comprises one or more predefined visual indicators selected to provide a visual cue to its associated phonemes. For example, bubbles, the color blue and other indicators of water are used in association with silent graphemes or silent letters, e.g., silent "e" or one of the vowels in a vowel blend. This provides an association with water and the cue that these graphemes cannot be heard as they are under water. In one embodiment, a single font color, e.g., black, is used for all graphemes, and additional visual cue graphics are provided within the black letters or as background for the black letters.

In one embodiment, color coding is used within the sections of the full image display pieces and the partial image display pieces. This includes the additional sections. The color coding can be applied to at least one of the background area of the sections, the graphical images within each section and the letters or graphemes located within each section. Color coding in accordance with exemplary embodiments of the present invention eliminates classifying more letters or graphemes into digraphs, consonant "le" syllable types and diphthongs among other classifications. In one embodiment, letters or graphemes are the basic consonant sounds and long vowels, short vowels and r-controlled are unique sounds. The short vowels and r-controlled need to be memorized anyway. The unique letters and sounds are colored with a common color, for example gold. In one embodiment, Closed Vowels or Short Vowels are colored green, and the Long Vowels are colored blue. The color association is used in combination with instructions as a teaching aide regarding the sounds associated with the letters or graphemes. A letter appearing on a bright yellow background with or without a sun or star graphic is used in combination with an instruction to locate the letter that is in the sun, e.g., the letter /i/ in the word Dive. The sun illustrates or illuminates that the /i/ is pronounced, i.e., it is in the sun. Alternatively, silent letters, e.g., silent /e/, appear in a blue or aqua color with a water background. Since these letters are under water, you do not pronounce them, i.e., it is difficult to hear under water.

In one embodiment, R-controlled vowels are colored red. In one embodiment, any two or more letters that combine into a unique sound that must be learned are colored a pre-defined unique color, e.g., gold or silver. In addition, a letter(s) that has a unique sound that must be learned is colored this same color. These letters include consonant digraphs, e.g., "sh", "th" and "ch", as well as vowel digraphs or diphthongs as illustrated in the words Book, "oo", and Town, "ow". This also includes Consonant "le". As the color of the grapheme or graphics is determined by the vowel in the second column and not in the last column, Consonant "le" may not constitute a separate distinct playing piece collection such as a separate world or planet but may be part of another playing piece collection as determined, for example, by the vowel in the second section. In one embodiment, Consonant "le" is found in two different playing piece collections. In one embodiment, the playing piece collections are configured by the number of syllables in the unique names associated with the graphical images.

In one embodiment, the unique name is the word "Bubble". All three "b" letters in the word are colored black, and the "le" is colored a specific unique color, e.g., gold, because the "le" makes a unique sound that the player or student must learn and memorize. For words containing the suffix "ment", the letters "m", "n" and "t" are colored black, and the vowel "e" is colored according to the sound it makes, i.e., long or short. In one embodiment, any vowel that is short or long is colored the same color as the short or long vowel sound associated with the vowel. For example, the word Read can be pronounced with a long "e" sound. The "e" is colored blue and is located in a sun graphic background. The "a" is located in an underwater graphic background. Alternatively, the word Read is pronounced with a short vowel sound. The letter "e" is colored green, and the letter "a" would still be located in an underwater graphic background. In the word Party, the letter "y" is colored blue, because this letter makes the long vowel sound /e/. However, the letter "y" would not be located in a sun graphic background. In the word Night, the letter "i" is colored blue and is located in a sun graphic background. The letters "gh" are located in an underwater graphic background. In the word Bought, the letter "o" is colored green, and the letters "ugh" are located in an underwater graphic background. In the word Fragment, the letter "e" is colored green if it makes a short vowel sound. Otherwise, that letter is colored the specific unique color used to imply unique sounds that must simply be learned and memorized. In the word Venture, the letter "t" is colored the specific unique color, e.g., gold, and the letters "ur" are colored red. The letter "e" is located in an underwater graphic background. In the word Fraction, the letters "tio" are colored the specific unique color, and the letter "n" is colored black.

For prefixes, a space is provided between the prefix and the additional letters appearing after the prefix. This emphasizes the prefix and helps with pronunciation as illustrated for the words Explode and Perform having the prefixes "Ex" and "Per" respectively.

| Explode | Ex pl | o | d | e |
| Perform | Per f | or | m | er |

In the word Explode, the letter "E" is colored green if it is a short vowel sound, and in the word Perform, the letters "er" are colored red as are the letters "or" as both are r-controlled.

Figure 5:
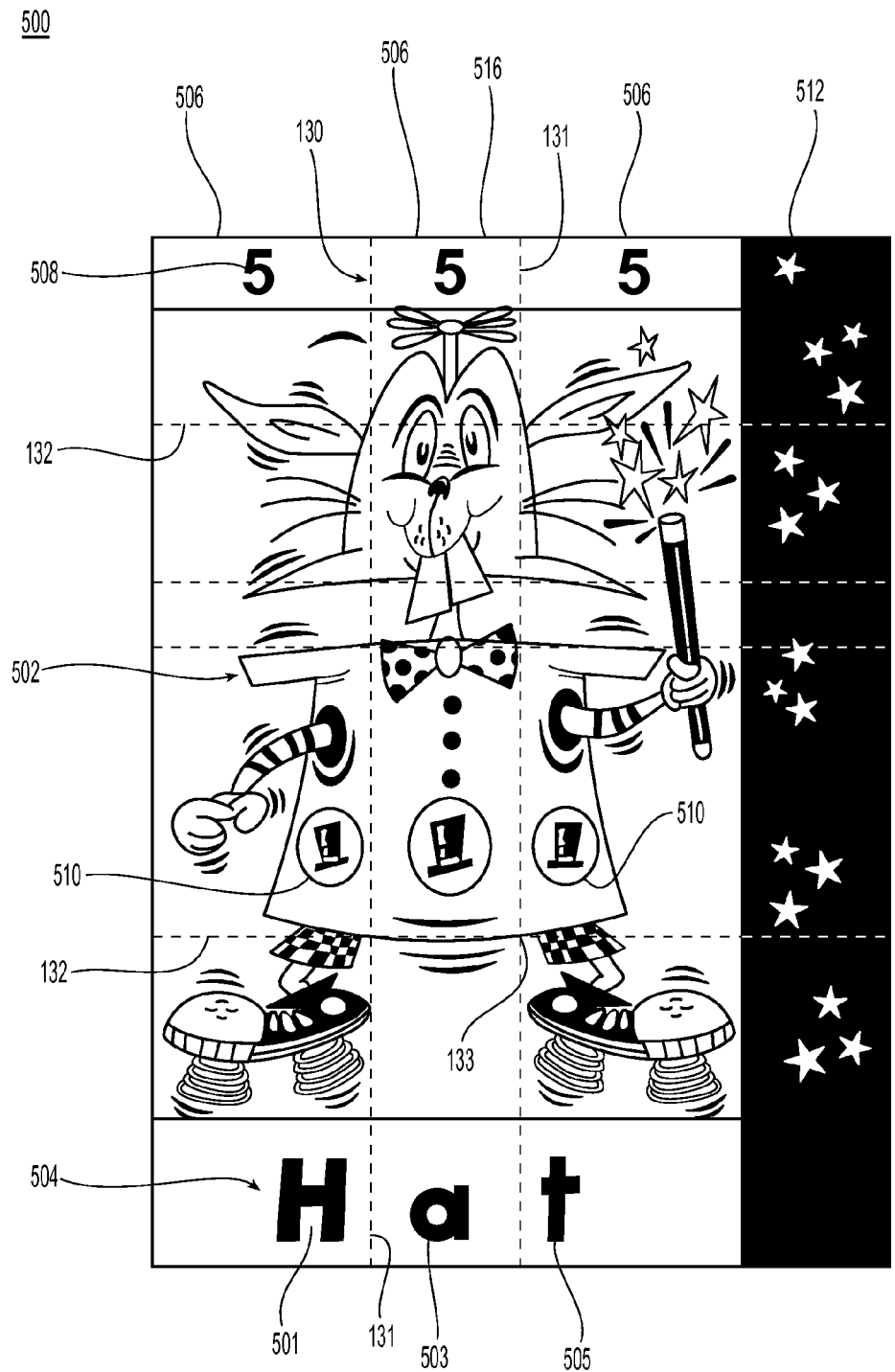
FIG. 5 is a view of the front of another embodiment of a full image display piece for use in the system for teaching phonemic awareness of the present invention.

Referring to FIGS. 5-10, additional embodiments of full images display pieces that are included in sets of display pieces are illustrated. In FIG. 5, another embodiment of an individual full image display piece 500 arranged as a playing card in accordance with the present invention is illustrated. The full image display piece includes a complete representation of a unique graphical image 502 associated with the set of display pieces that contains this full image display piece. In addition, the full image display piece includes all of the graphemes constituting the unique name 504 associated with the graphical image 502. As illustrated, the graphical image is a cartoon representation of a rabbit jumping out of a hat, and the associated unique name is Hat. The graphical representation includes a magical wand, and springs on the rabbit's shoes, which are all qualities associated with a jumping rabbit being pulled from a hat by a magician. The unique name, Hat, is a single syllable word constructed from a grouping of the phonemes "h" 501, "a" 503 and "t" 505.

The full image display piece includes a plurality of distinct sections 506. As illustrated, the full image display piece includes three distinct sections. The graphical image and plurality of sections are arranged on the display piece such that each section includes a unique and non-overlapping portion of the graphical image associated with the set of display pieces containing that full image display piece. Therefore, no two sections comprise an identical portion of the graphical image. In addition, each section includes at least one of the graphemes constituting the unique name 504 associated with that graphical image 502. As illustrated, each section contains exactly one of the graphemes. The full image display piece 500 also includes at least one additional section 512 and a unique alpha-numeric designation 508 that is common to all display pieces within that set of display pieces. Each portion of the graphical image contained in one of the sections of the full image display piece includes an additional graphical representation 510 of the unique name associated with that graphical image. As illustrated, an additional graphical representation of a hat is included within each section of the graphical image. The graphemes are provided in a black font that may be printed on a colored background.

Figure 6:
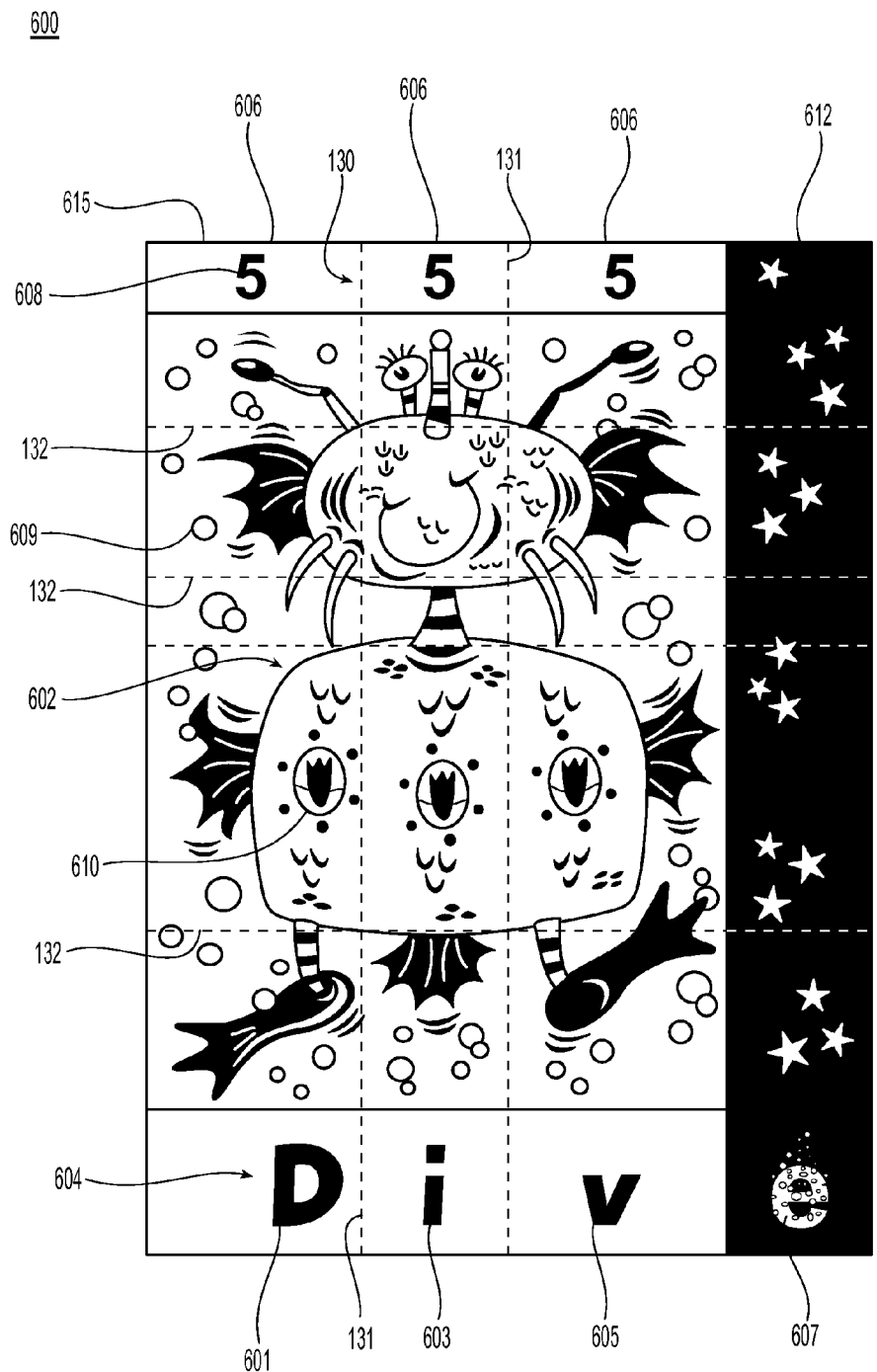
FIG. 6 is a view of the front of another embodiment of a full image display piece for use in the system for teaching phonemic awareness of the present invention.

In FIG. 6, another embodiment of an individual full image display piece 600 arranged as a playing card in accordance with the present invention is illustrated. The full image display piece includes a complete representation of a unique graphical image 602 associated with the set of display pieces that contains this full image display piece. In addition, the full image display piece includes all of the graphemes constituting the unique name 604 associated with the graphical image 602. As illustrated, the graphical image is a cartoon representation of an undersea creature, and the associated unique name is Dive. The graphical representation includes a creature with fins and scales as well as a background including bubbles 609, which are all qualities associated with an undersea creature. The unique name, Dive, is a single syllable word constructed from a grouping of the phonemes "d" 601, "i" 603, "v" 605 and silent "e" 607.

The full image display piece includes a plurality of distinct sections 606. As illustrated, the full image display piece includes three distinct sections. The graphical image and plurality of sections are arranged on the display piece such that each section includes a unique and non-overlapping portion of the graphical image associated with the set of display pieces containing that full image display piece. Therefore, no two sections comprise an identical portion of the graphical image. In addition, each section includes at least one of the graphemes constituting the unique name 604 associated with that graphical image 602. As illustrated, each section contains exactly one of the graphemes. The full image display piece 600 also includes at least one additional section 612 and a unique alpha-numeric designation 608 that is common to all display pieces within that set of display pieces. In this embodiment, the additional section 612 includes the silent "e" grapheme 607. The grapheme "e" is provided in a white or blue font and includes bubbles or other graphical indicators of water. Therefore, the system user or student is provided with the visual cue that the silent "e" letter is underwater and is not voiced, i.e., is silent. Each portion of the graphical image contained in one of the sections of the full image display piece includes an additional graphical representation 610 of the unique name associated with that graphical image. As illustrated, an additional graphical representation of a swim fin or flipper that is included within each section of the graphical image. The graphemes are provided in a black font that may be printed on a colored background.

Figure 7:
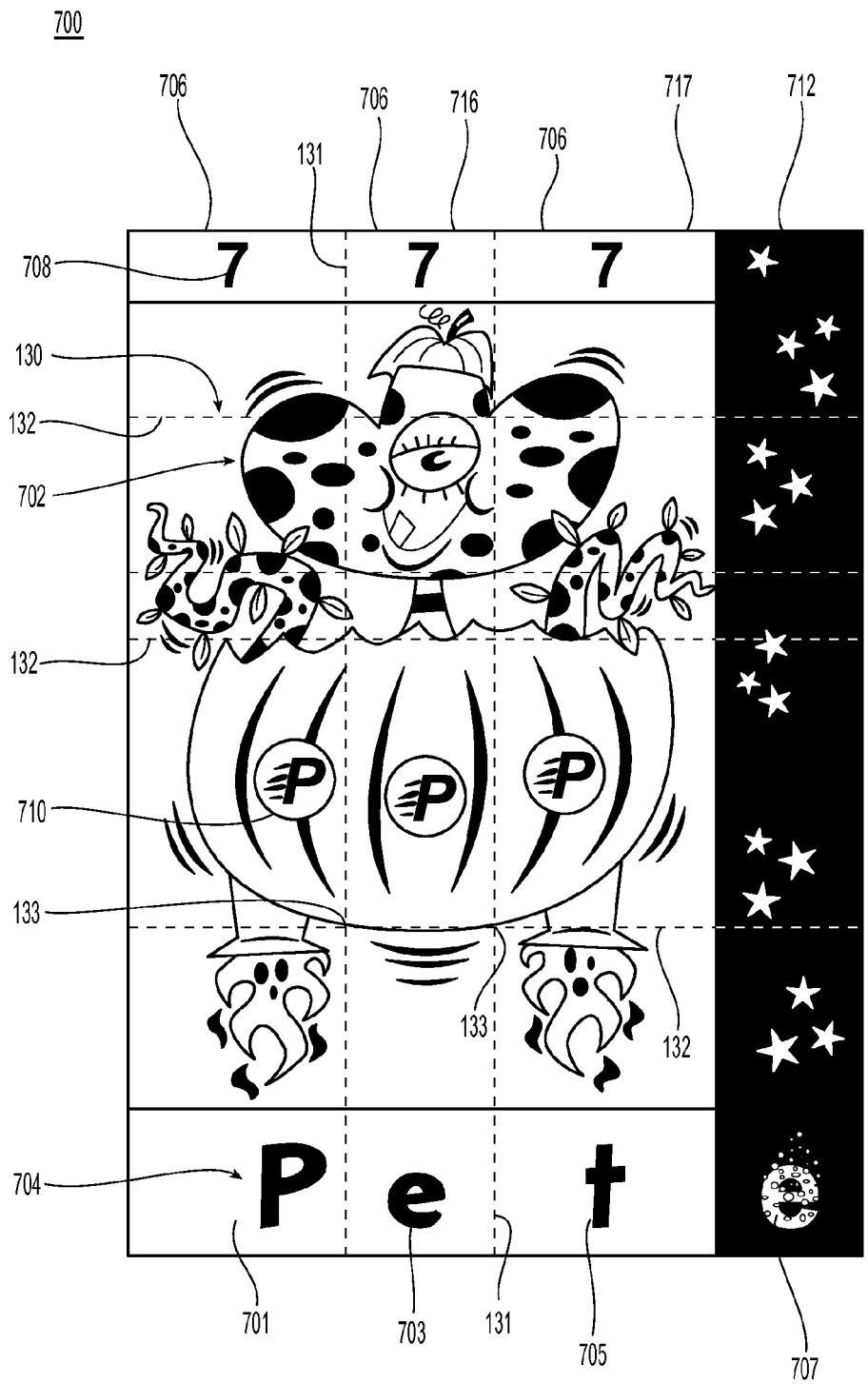
FIG. 7 is a view of the front of another embodiment of a full image display piece for use in the system for teaching phonemic awareness of the present invention.

In FIG. 7, another embodiment of an individual full image display piece 700 arranged as a playing card in accordance with the present invention is illustrated. The full image display piece includes a complete representation of a unique graphical image 702 associated with the set of display pieces that contains this full image display piece. In addition, the full image display piece includes all of the graphemes constituting the unique name 704 associated with the graphical image 702. As illustrated, the graphical image is a cartoon representation of a cartoon creature in a pumpkin, and the associated unique name is the proper noun Pete. The graphical representation includes a pumpkin body, vine like arms and rocket legs, which are arranged to illustrate the qualities associated with the imaginary creature known as Pete. The unique name, Pete, is a single syllable word constructed from a grouping of the phonemes "p" 701, "e" 703, "t" 705 and silent "e" 707.

The full image display piece includes a plurality of distinct sections 706. As illustrated, the full image display piece includes three distinct sections. The graphical image and plurality of sections are arranged on the display piece such that each section includes a unique and non-overlapping portion of the graphical image associated with the set of display pieces containing that full image display piece. Therefore, no two sections comprise an identical portion of the graphical image. In addition, each section includes at least one of the graphemes constituting the unique name 704 associated with that graphical image 702. As illustrated, each section contains exactly one of the graphemes. The full image display piece 700 also includes at least one additional section 712 and a unique alpha-numeric designation 708 that is common to all display pieces within that set of display pieces. In this embodiment, the additional section 712 includes the silent "e" grapheme 707. The grapheme "e" is provided in a white or blue font and includes bubbles or other graphical indicators of water. Therefore, the system user or student is provided with the visual cue that the silent "e" letter is underwater and is not voiced, i.e., is silent. Each portion of the graphical image contained in one of the sections of the full image display piece includes an additional graphical representation 710 of the unique name associated with that graphical image. As illustrated, an additional graphical representation of a capital "P" is included within each section of the graphical image. The graphemes are provided in a black font that may be printed on a colored background.

Figure 8:
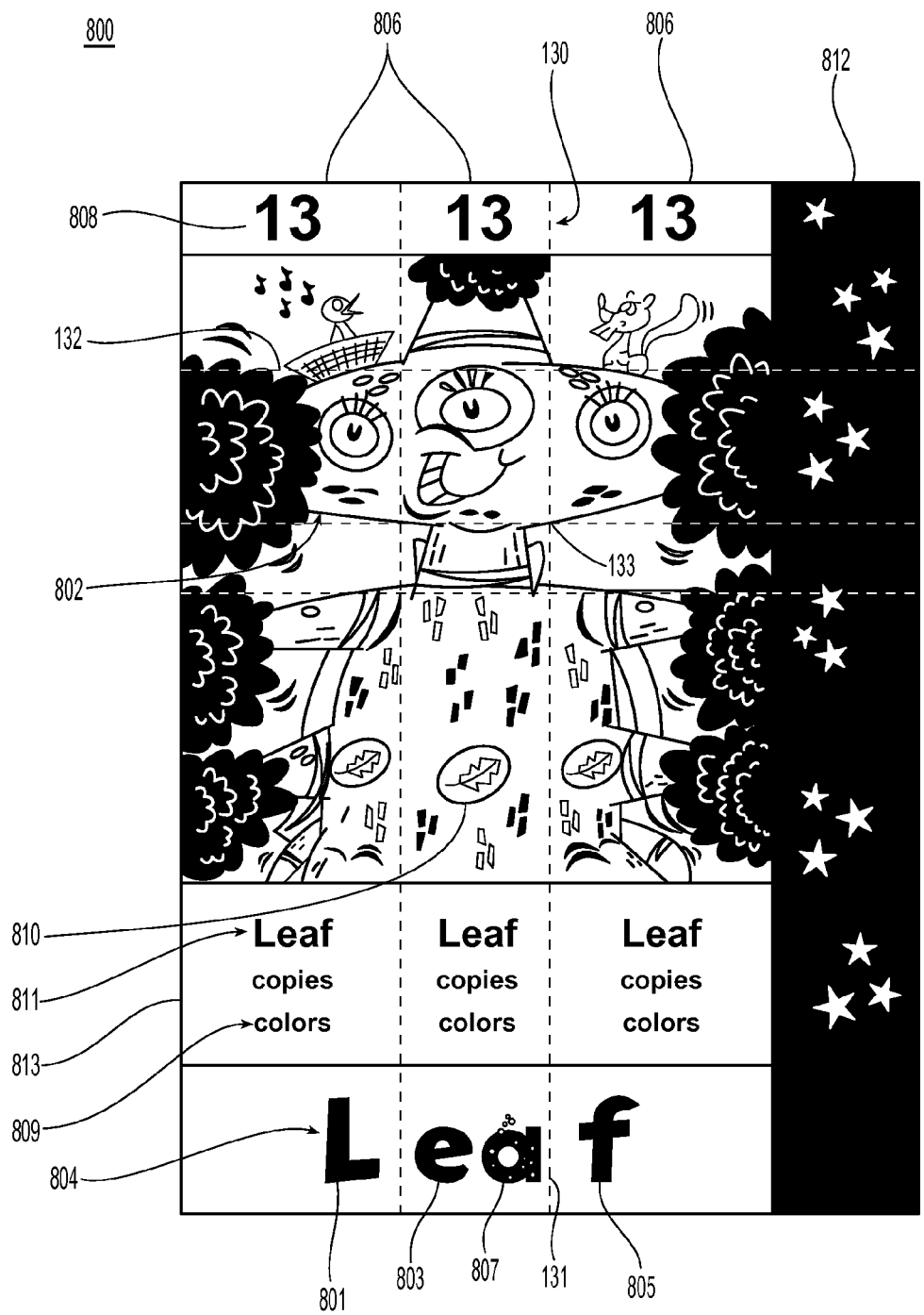
FIG. 8 is a view of the front of another embodiment of a full image display piece for use in the system for teaching phonemic awareness of the present invention.

In FIG. 8, another embodiment of an individual full image display piece 800 arranged as a playing card in accordance with the present invention is illustrated. The full image display piece includes a complete representation of a unique graphical image 802 associated with the set of display pieces that contains this full image display piece. In addition, the full image display piece includes all of the graphemes constituting the unique name 804 associated with the graphical image 802. As illustrated, the graphical image is a cartoon representation of a tree, and the associated unique name is Leaf, which is part of a tree. The graphical representation includes a trunk, root-like legs, bark texture and tree creatures, which are qualities associated with trees. The unique name, Leaf, is a single syllable word constructed from a grouping of the phonemes "l" 801, "ea" 803 and f' 805.

The full image display piece includes a plurality of distinct sections 806. As illustrated, the full image display piece includes three distinct sections. The graphical image and plurality of sections are arranged on the display piece such that each section includes a unique and non-overlapping portion of the graphical image associated with the set of display pieces containing that full image display piece. Therefore, no two sections comprise an identical portion of the graphical image. In addition, each section includes at least one of the graphemes constituting the unique name 804 associated with that graphical image 802. The full image display piece 800 also includes at least one additional section 812 and a unique alpha-numeric designation 808 that is common to all display pieces within that set of display pieces. Each portion of the graphical image contained in one of the sections of the full image display piece includes an additional graphical representation 810 of the unique name associated with that graphical image. As illustrated, the additional graphical representation is a leaf. The graphemes are provided in a black font that may be printed on a colored background. In this embodiment, however, the "a" 807 in the "ea" phoneme 803 includes bubbles or other graphical indicators of water. Therefore, the system user or student is provided with the visual cue that in the "ea" vowel blend the "a" is underwater and is not voiced, i.e., is silent. In this embodiment, each one of the plurality of distinct sections 806 also includes a graphical image function section 813. This graphical image function section 813 occupies only a portion of each distinct section 806. The graphical image function section 813, therefore, will appear on each partial image display piece. This section may be incorporated in any embodiment of the partial image and full image display pieces of the present invention. In one embodiment, each graphical image function section 813 includes the unique name 811 associated with that graphical image and the unique functionalities 809 associate with the fictional character of that graphical image. As illustrated, the unique functionality associated with Leaf is the ability to copy colors, because the leaves on a tree change colors in the fall. This power is provided to the player upon accumulation and assembly of all of the partial image display pieces associated with this full image display piece.

Figure 9:
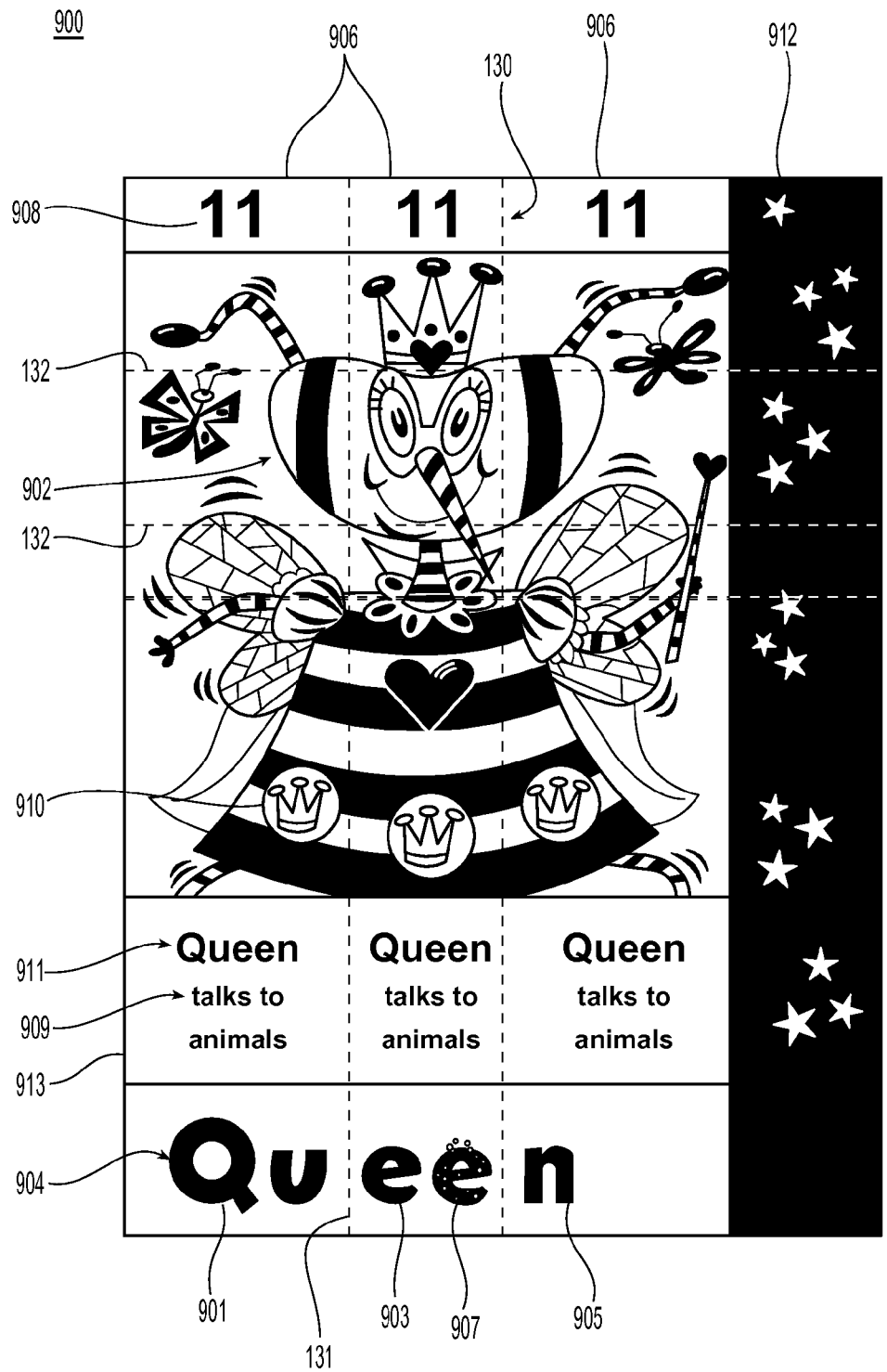
FIG. 9 is a view of the front of another embodiment of a full image display piece for use in the system for teaching phonemic awareness of the present invention.

In FIG. 9, another embodiment of an individual full image display piece 900 arranged as a playing card in accordance with the present invention is illustrated. The full image display piece includes a complete representation of a unique graphical image 902 associated with the set of display pieces that contains this full image display piece. In addition, the full image display piece includes all of the graphemes constituting the unique name 904 associated with the graphical image 902. As illustrated, the graphical image is a cartoon representation of a queen bee, and the associated unique name is Queen. The graphical representation includes wings, a stinger, antenna and a crown, which are qualities associated with bees and/or queens. The unique name, Queen, is a single syllable word constructed from a grouping of the phonemes "qu" 901, "ee" 903 and "n" 905.

The full image display piece includes a plurality of distinct sections 906. As illustrated, the full image display piece includes three distinct sections. The graphical image and plurality of sections are arranged on the display piece such that each section includes a unique and non-overlapping portion of the graphical image associated with the set of display pieces containing that full image display piece. Therefore, no two sections comprise an identical portion of the graphical image. In addition, each section includes at least one of the graphemes constituting the unique name 904 associated with that graphical image 902. The full image display piece 900 also includes at least one additional section 912 and a unique alpha-numeric designation 908 that is common to all display pieces within that set of display pieces. Each portion of the graphical image contained in one of the sections of the full image display piece includes an additional graphical representation 910 of the unique name associated with that graphical image. As illustrated, the additional graphical representation is a crown. The graphemes are provided in a black font that may be printed on a colored background. In this embodiment, however, the second "e" 907 in the "ee" phoneme 903 includes bubbles or other graphical indicators of water. Therefore, the system user or student is provided with the visual cue that in the "ee" vowel blend the second "e" is underwater and is not voiced, i.e., is silent. In this embodiment, each one of the plurality of distinct sections 906 also includes a graphical image function section 913. This graphical image function section 913 occupies only a portion of each distinct section 906. The graphical image function section 913, therefore, will appear on each partial image display piece. This section may be incorporated in any embodiment of the partial image and full image display pieces of the present invention. In one embodiment, each graphical image function section 913 includes the unique name 911 associated with that graphical image and the unique functionalities 909 associated with the fictional character of that graphical image. As illustrated, the unique functionality associated with Queen is the ability to talk to animals. This power is provided to the player upon accumulation and assembly of all of the partial image display pieces associated with this full image display piece.

Figure 10:
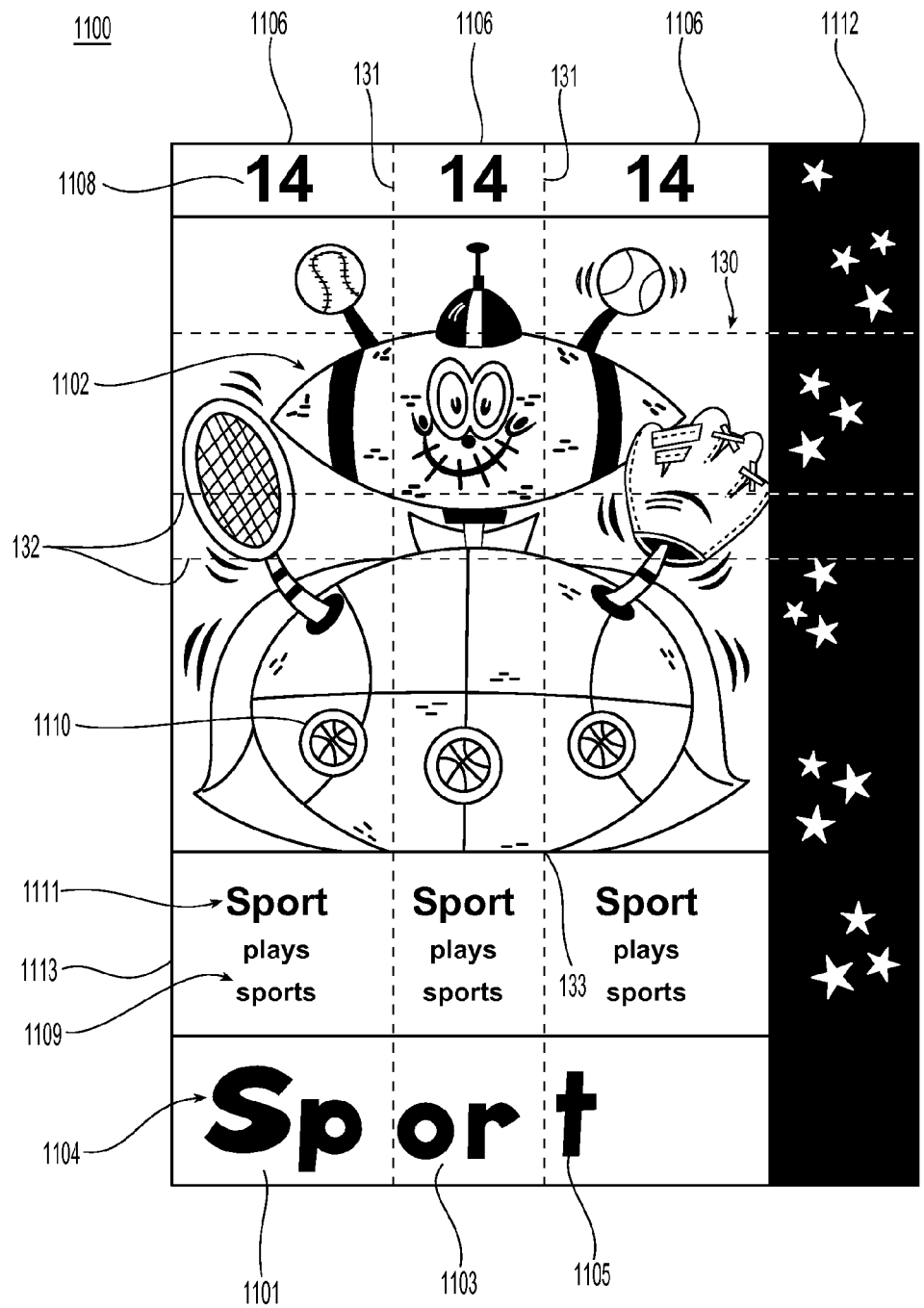
FIG. 10 is a view of the front of another embodiment of a full image display piece for use in the system for teaching phonemic awareness of the present invention.

In FIG. 10, another embodiment of an individual full image display piece 1100 arranged as a playing card in accordance with the present invention is illustrated. The full image display piece includes a complete representation of a unique graphical image 1102 associated with the set of display pieces that contains this full image display piece. In addition, the full image display piece includes all of the graphemes constituting the unique name 1104 associated with the graphical image 1102. As illustrated, the graphical image is a cartoon representation of a character constructed from a variety of different pieces of sports equipment, and the associated unique name is Sport. The graphical representation includes a football head, basketball body and a tennis racket arm among other pieces of athletic equipment, which are all qualities associated with sports or athletics. The unique name, Sport, is a single syllable word constructed from a grouping of the phonemes "Sp" 1101, "or" 1103 and "t" 1105.

The full image display piece includes a plurality of distinct sections 1106. As illustrated, the full image display piece includes three distinct sections. The graphical image and plurality of sections are arranged on the display piece such that each section includes a unique and non-overlapping portion of the graphical image associated with the set of display pieces containing that full image display piece. Therefore, no two sections comprise an identical portion of the graphical image. In addition, each section includes at least one of the graphemes constituting the unique name 1104 associated with that graphical image 1102. As illustrated, each section contains exactly one of the graphemes. The full image display piece 1100 also includes at least one additional section 1112 and a unique alpha-numeric designation 1108 that is common to all display pieces within that set of display pieces. Each portion of the graphical image contained in one of the sections of the full image display piece includes an additional graphical representation 1110 of the unique name associated with that graphical image. As illustrated, an additional graphical representation of a basketball is included within each section of the graphical image. The graphemes are provided in a black font that may be printed on a colored background. In this embodiment, each one of the plurality of distinct sections 1106 also includes a graphical image function section 1113. This graphical image function section 1113 occupies only a portion of each distinct section 1106. The graphical image function section 1113, therefore, will appear on each partial image display piece. This section may be incorporated in any embodiment of the partial image and full image display pieces of the present invention. In one embodiment, each graphical image function section 1113 includes the unique name 1111 associated with that graphical image and the unique functionalities 1109 associated with the fictional character of that graphical image. As illustrated, the unique functionality associated with Sport is the ability to play sports. This power is provided to the player upon accumulation and assembly of all of the partial image display pieces associated with this full image display piece.

In all of these additional embodiments of an individual full image display piece, the unique alpha-numeric designation is a number that is unique to each embodiment. Therefore, this gives an indication of the sequence in which these full image display pieces are introduced and used in the system of the present invention. In addition, all of the graphical images in the disclosed embodiments include a variety of colors arranged to enhance the appearance of the graphical images.

Figure 2:
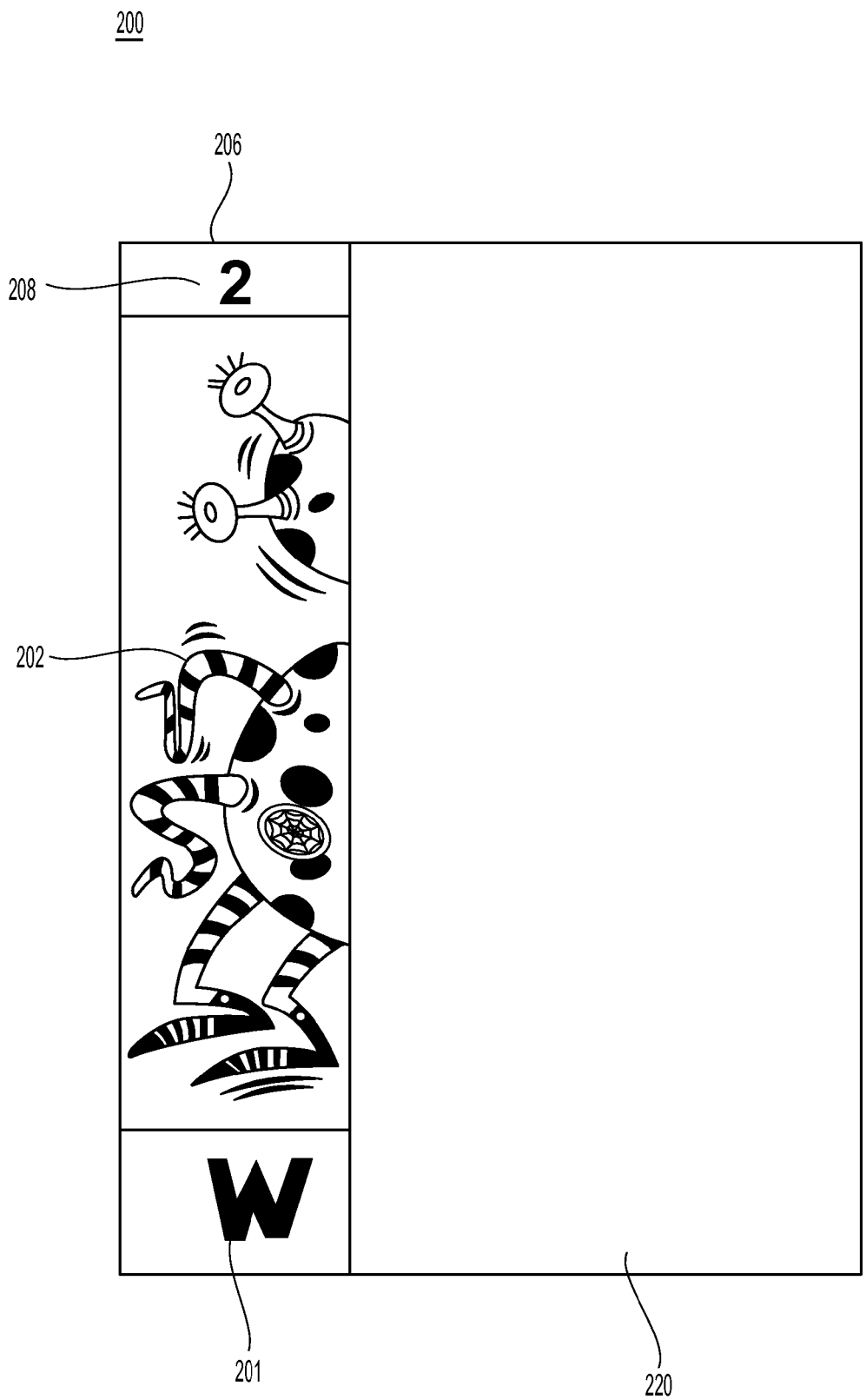
FIG. 2 is a view of the front of an embodiment of a first partial image display piece corresponding to the full image display piece of FIG. 1.
Figure 3:
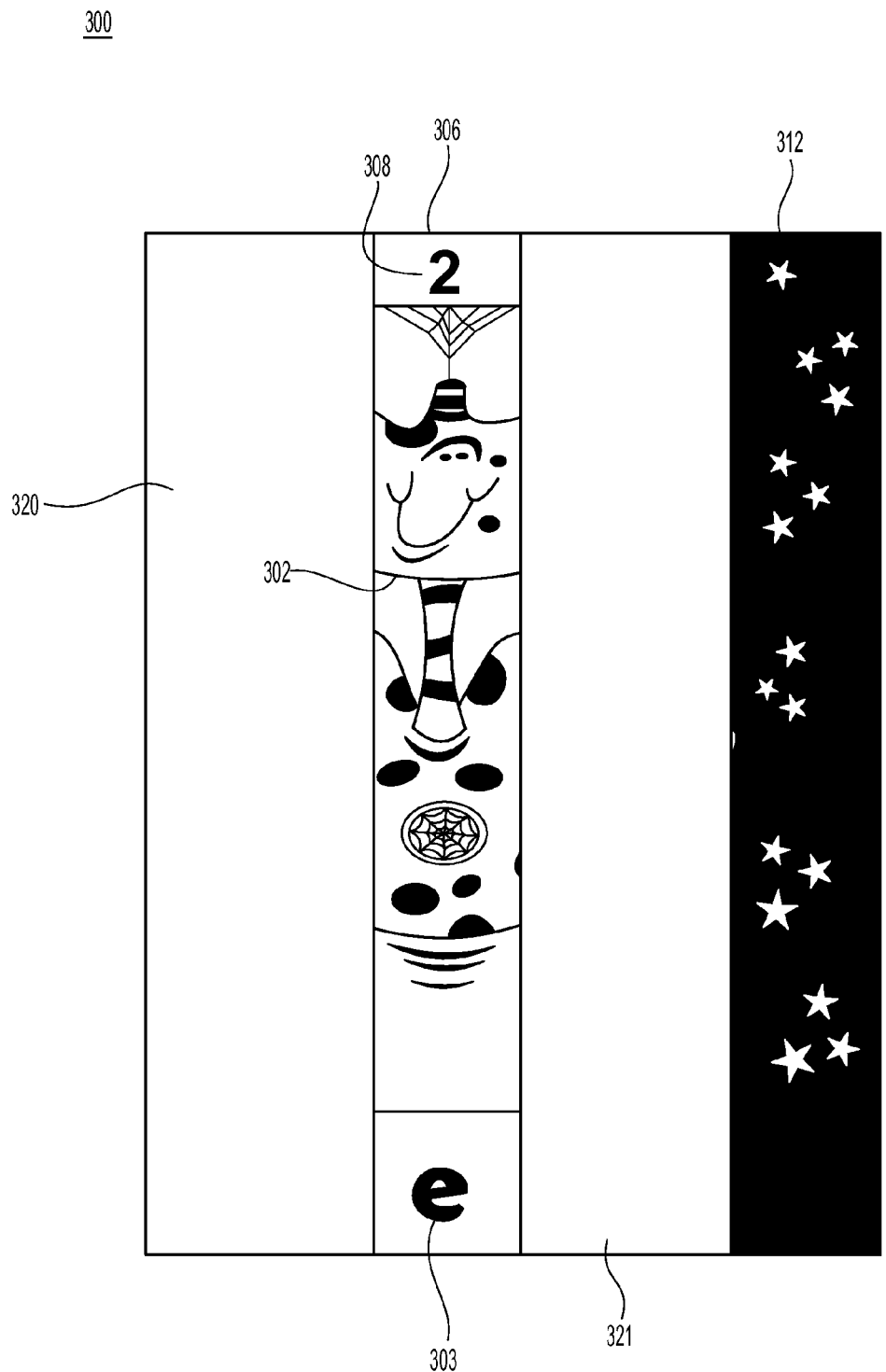
FIG. 3 is a view of the front of an embodiment of a second partial image display piece corresponding to the full image display piece of FIG. 1.
Figure 4:
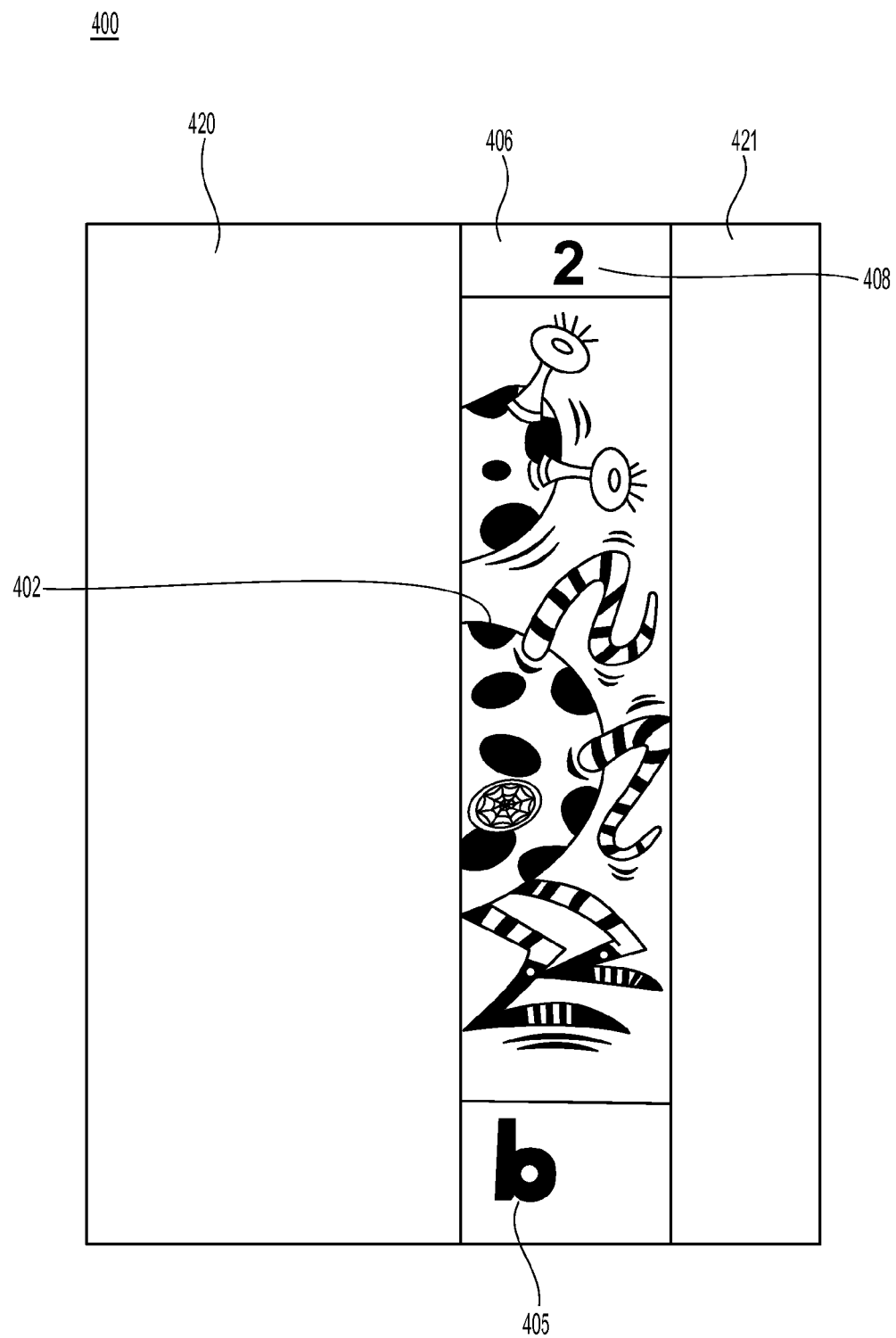
FIG. 4 is a view of the front of an embodiment of a third partial image display piece corresponding to the full image display piece of FIG. 1.

The system for teaching phonemic awareness in accordance with the present invention also includes partial image display pieces arranged such that each set of display pieces includes a plurality of partial image display pieces. Referring to FIGS. 2-4, an embodiment of a plurality of partial display pieces associated with the set of display pieces containing the full display piece of FIG. 1 is illustrated. As illustrated, the set of display pieces includes a first partial display piece 200 (FIG. 2), a second partial display piece 300 (FIG. 3) and a third partial display piece 400 (FIG. 4). The number of partial display pieces corresponds to the number of phonemes or the number of sections 106 in the full image display piece 100.

Each partial image display piece includes a unique portion of the graphical image associated with that set of display pieces and at least one of the graphemes constituting the unique name associated with that graphical image. Therefore, no two partial image display pieces contain an identical portion of the graphical image. In one embodiment, each partial image display piece comprises exactly one grapheme.

In FIG. 2, the first partial image display piece 200 includes at least one opaque section 206 containing a first portion 202 of the graphical image 102 contained on the full image display piece. Within the opaque section 206 of the first partial image display piece is the unique alpha-numeric designation 208, i.e., the number 2, associated with the set of display pieces containing the first partial image display piece. The opaque section 206 includes at least one of the graphemes 201 from the unique name 104 associated with the set of display pieces containing the first partial image display piece. In one embodiment, the opaque section 206 of the first partial image display piece 200 is an exact copy of a first section 115 of the full image display piece 100. In addition, the opaque section 206 occupies the same location on its display piece as the first section 115, and the opaque section 206 and first section 115 align when one display piece is placed over the other display piece. The first partial image display piece 200 also includes at least one transparent section 220. In one embodiment, this transparent section occupies portions of the display piece not covered by the opaque section 206.

In FIG. 3, the second partial image display piece 300 includes at least one opaque section 306 containing a second portion 302 of the graphical image 102 contained on the full image display piece. Within the opaque section 306 of the second partial image display piece is the unique alpha-numeric designation 308, i.e., the number 2, associated with the set of display pieces containing the second partial image display piece. The opaque section 306 includes at least one of the graphemes 303 from the unique name 104 associated with the set of display pieces containing the second partial image display piece. In one embodiment, the opaque section 306 of the second partial image display piece 300 is an exact copy of a second section 116 of the full image display piece 100. In addition, the opaque section 306 occupies the same location on its display piece as the second section 116, and the opaque section 306 and second section 116 align when one display piece is placed over the other display piece. The second partial image display piece 300 also includes a pair of transparent sections 320, 321. In one embodiment, these transparent sections occupy portions of the display piece not covered by the opaque section 306.

The second partial image display piece 300 contains an additional opaque section 312. This additional opaque section 312 comprises a black section that may include additional graphics such as stars that are indicative of a night-themed environment. This additional opaque section 312 aligns with the additional section 112 of the full image display piece 100 when one display piece is placed over the other display piece. In one embodiment, all partial image display pieces include an additional opaque section. In this embodiment, all of the additional opaque sections are identical, for example an identical black section. In one embodiment, all additional opaque sections align when the partial image display pieces are grouped together or placed over top of each other, i.e., stacked. In another embodiment, the additional opaque sections are at least associated with those partial image display pieces having an opaque section containing a grapheme that is associated with a silent "e" that appears in the additional opaque section. For example, a partial image display piece containing the grapheme for long "i" in an opaque section will also contain an additional opaque section containing the grapheme for silent "e" when the unique name is Dive as in a partial image display piece that corresponds to the full image display piece of FIG. 6. In this embodiment, the opaque section and the additional opaque section in one embodiment are not contiguous on the display piece, and a transparent section is disposed between the opaque section and the additional opaque section. In another embodiment, the two sections are contiguous.

In FIG. 4, the third partial image display piece 400 includes at least one opaque section 406 containing a third portion 402 of the graphical image 102 contained on the full image display piece. Within the opaque section 406 of the third partial image display piece is the unique alpha-numeric designation 408, i.e., the number 2, associated with the set of display pieces containing the third partial image display piece. The opaque section 406 includes at least one of the graphemes 405 from the unique name 104 associated with the set of display pieces containing the third partial image display piece. In one embodiment, the opaque section 406 of the third partial image display piece 400 is an exact copy of a third section 117 of the full image display piece 100. In addition, the opaque section 406 occupies the same location on its display piece as the third section 117, and the opaque section 406 and third section 117 align when one display piece is placed over the other display piece. The third partial image display piece 400 also includes a pair of transparent sections 420, 421. In one embodiment, these transparent sections occupy portions of the display piece not covered by the opaque section 406.

Each one of the individual partial image display pieces in a given set of display pieces can be placed or stacked over top of the full image display piece of the same set, and the full image and all information on the display pieces is still visible. In one embodiment, portions of the display pieces are blocked or obscured when the partial image display pieces are stacked over top of the full image display piece. In addition, the plurality of partial image display pieces is configured to form the full graphical image and unique name when all of the partial image display pieces are grouped together. When the display pieces are configured as individual playing cards, grouping of the cards includes stacking the cards one on top of the other. The cards can be stacked in any order as the opaque section of each partial image display piece aligns with the transparent sections of all other partial image display pieces in the set of display pieces. In the system for teaching phonemic awareness in accordance with the present invention, system users or students accumulate and group the partial image display pieces in order to generate the full graphical images and associated unique names. The full image display pieces, graphical images and alpha-numeric designations are used to guide users and students in the accumulation and grouping of sets of partial image display pieces. Additional or subsequent groupings of sets of displays pieces are obtained once a given set of display pieces in the sequence of sets of display pieces is completed. Rewards are offered within the context of the system upon completion of a given set of display pieces.

In addition to the partial display pieces within a given set of display pieces being configured to group together or stack together to form a complete graphical representation and unique name, all of the partial display pieces across all of the sets of display pieces can be configured to be grouped together. This is accomplished using a common size and shape for all of the display pieces. In addition, the number and size of the sections, including the opaque sections, transparent sections and additional opaque sections for all of the full image and partial image display pieces are uniform across all sets of display pieces.

As illustrated in FIGS. 5-10, the graphical images in all of the sets of graphical images are created using a common grid 130 that is common across all graphical images on all partial image and full image display pieces. The grid is not actually displayed on the partial image and full image display pieces but is used in creating the graphical images and aligning the graphical images on the partial image and full image display pieces. This allows the graphical images on the partial image display pieces and the full image display pieces to be stacked and aligned. This alignment can be accomplished across all graphical images by making common points of contact with the grid across all graphical images. In one embodiment, the common grid 130 includes a plurality of vertical grid lines 131 and a plurality of horizontal grid lines 132. The common grid, vertical grid lines and horizontal grid lines are identical across all partial image display pieces and full image display piece. Therefore, each full image display piece and set of partial image display pieces includes an equivalent number of vertical grid lines and horizontal grid lines. In one embodiment, the vertical grid lines 131 correspond to the divisions between the distinct sections of the full image display piece. In addition, the graphical image function sections are bound by the horizontal and vertical grid lines in each distinct section.

In one embodiment, the common grid defines the points at which the graphical images extend or cross between adjacent sections of a given full image display piece. This is illustrated, for example, at points of contact 133 between the vertical and horizontal grid lines which can correspond to points of contact between outlines of the graphical images and the common grid. In one embodiment, these are the points where the outlines of the graphical images cross between adjacent distinct sections. This also defines the cross sections of the graphical images found in the various opaque sections of the partial image display pieces. This uniformity allows all of the graphical image portions in all of opaque sections of all of the partial image display pieces across all sets of display pieces to align. Therefore, partial image display pieces, which in one embodiment are referred to as Morph Pieces or Morph Cards, can be assembled across sets of displays pieces to create new characters, new unique names and new phoneme combinations. Suitable names for these new characters include, but are not limited to Funny-Mixer Friends. In one embodiment, the new characters are provided with unique powers within the context of the game, i.e., super powers, and the new characters are referred to as Super Funny-Mixer Friends.

Figure 11:
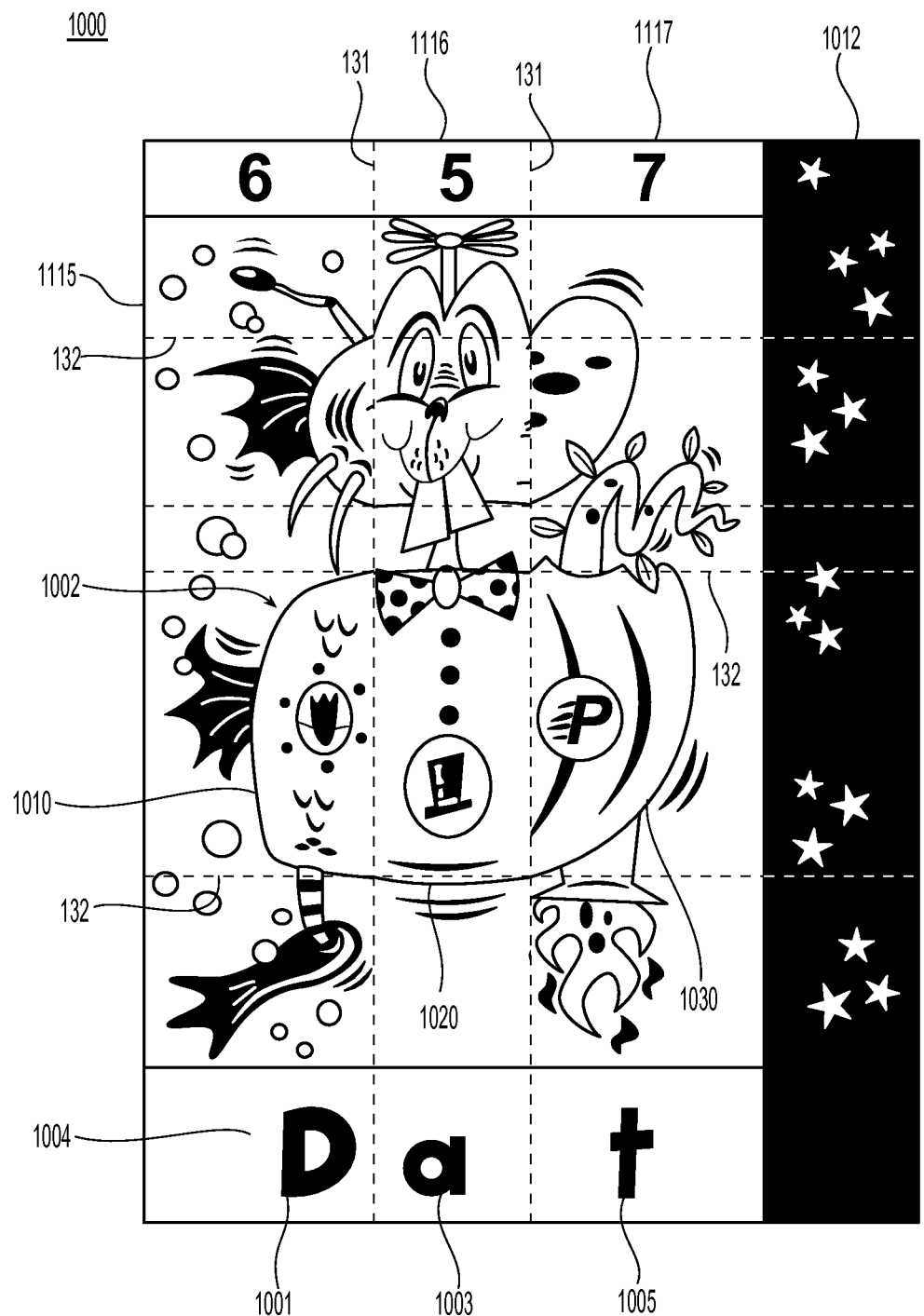
FIG. 11 is a view of the front of a grouping of a plurality of partial image display pieces to create an embodiment of a modified character for use in the system for teaching phonemic awareness of the present invention.

Referring to FIG. 11, an exemplary combination of a unique assembly of partial image display pieces 1000 selected across several sets of display pieces is illustrated. The display pieces include a first partial image display piece 1115 having an opaque section containing a portion of the graphical image 1010 corresponding to a first section 615 of the full image display piece 600 of FIG. 6, a second partial image display piece 1116 having an opaque section containing a portion of the graphical image 1020 corresponding to a second section 516 of the full image display piece 500 of FIG. 5 and a third partial image display piece 1117 having an opaque section containing a portion of the graphical image 1030 corresponding to a third section 717 of the full image display piece 700 of FIG. 7. A hybrid graphical image 1002 results, and all of the portions of this hybrid graphical image are aligned across all of the opaque sections of the partial image display pieces based on the common grid. In addition, at least one and potentially all three of the partial image display pieces contribute the additional black opaque section 1012 to the hybrid graphical image. This grouping also results in the hybrid name "Dat" 1004 containing the phonemes "D" 1001, "a" 1003 and "t" 1005 from their respective partial image display pieces. The resulting hybrid names can be actual words, proper nouns or nonsense words. Rewards or points are achieved based on the type of hybrid name created. The display pieces can be grouped or stacked in any order. In one embodiment, where a silent "e" is required or desired in the additional opaque section 1012, the display pieces are stacked such that the silent "e" is not obscured by other additional opaque sections. As illustrated, the additional opaque section does not include a silent "e". The silent "e" would have been associated with the phoneme "a" 1003. The word "hat" however, does not have a silent "e". The word Pete does have a silent "e"; however, this is associated with the partial image display piece containing the second portion 716 of the graphical image and not the partial image display piece containing the third portion 717, i.e., the phoneme "t" 705. If "a" had been associated with a silent "e", then the display pieces would be grouped in an order to spell the hybrid word "Date".

In order to facilitate the accumulation of the display pieces and the earning of rewards, exemplary embodiments of systems in accordance with the present invention include a predefined instructional environment. The instructional environment includes a predefined spatial context and predefined rules governing the acquisition and utilization of individual display pieces within the predefined spatial context. As used herein, the spatial context defines the space or physical context in which the sets of display pieces are located, accumulated and assembled. Suitable spatial contexts include real and imaginary worlds or environments into which the individual display pieces are distributed. The predefined rules apply to the imaginary world and define movements and interactions through this imaginary world. The predefined rules also express rewards for meeting goals and penalties for violating rules or failing to meet goals. The spatial context and rules can be expressed in a physical game such as a card game or a board game utilizing the display pieces. In addition, the spatial context and rules are expressed in a computer-based networked computing system. The spatial context defines a world and graphical environment in which characters or game participants move, and the rules govern movement through this environment. The graphical images assigned to the sets of display pieces have context within the spatial context. For example, if the spatial context is a given city or world, the graphical images are inhabitants or objects located within this world.

Users and/or students navigate or move through the spatial context in accordance with the predefined rules to locate, accumulate and assemble the sets of display pieces. In one embodiment, the pre-defined instructional environment comprises a gaming environment. In the gaming environment each graphical image represents a fictional character or other objects, e.g., tools, weapons or currency, within the gaming environment. This gaming environment provides the pre-defined spatial context, and the predefined rules for the gaming environment govern fictional character creation, fictional character acquisition, fictional character utilization, fictional character interactions and fictional character disposition within the predefined spatial context.

In one embodiment, the predefined rules of the gaming environment include rewards for accumulating a given set of partial image display pieces. These rewards include, but are not limited to, points, currency, strength, health, knowledge, life, information helpful in the location and accumulation of additional sets of display pieces and unique powers that can be used within the gaming environment. In one embodiment, each fictional character comprises at least one unique functionality or power within the gaming environment. Accumulation of all of the partial display pieces for a given fictional character results in the user or student being rewarded with the unique functionalities of the fictional character. These unique functionalities are then available to the user or student during continued use of the system. In one embodiment, the unique functionality of a given graphical image, i.e., character, is printed on at least one of the display pieces containing that graphical image in the graphical image function section as discussed above.

The gaming aspect of the system encourages or entices use of the system by the user or student even outside of a conventional, monitored learning environment. Network-based applications also facilitate simultaneous participation and interaction among a plurality of users or students within a given gaming environment. This facilitates the social network aspect of the systems of the present invention that further encourages student use of the system. The interaction among students in the gaming environment can take the form of competition for sets of gaming pieces or cooperation in the accumulation of sets of gaming pieces through the shared use of resources, knowledge and powers. In one embodiment, younger students can be introduced to the system through a physical, card-based gaming environment and then transitioned to a computer-based and network version of the system as the student matures. This leverages the natural progression in student learning and interests and extends the length of time that the students use the system of the present invention. Overall, knowledge and manipulation of phonemes is consistently required and reinforced in order to locate, accumulate and group the display pieces. However, for younger or less advanced players or users, these players can simply match portions of the graphical images. Users and students need to understand the phonemes and how the phonemes work together to form the unique names in order to move through the spatial context to locate partial image display cards. For example, the partial image display pieces containing the phonemes are located within the spatial context based on their type, their sound or their relationship to other phonemes. An understanding of these qualities is necessary in order to navigate properly through the defined spatial context to locate the required partial image display pieces. In a computer-based system, input devices such as a microphone are used to receive verbal input from the user voicing the phoneme of a given partial image display piece, phoneme blends or entire unique names in order to obtain a given partial image display piece(s) or to receive credit for the completion of a given set of display pieces.

Figure 12:
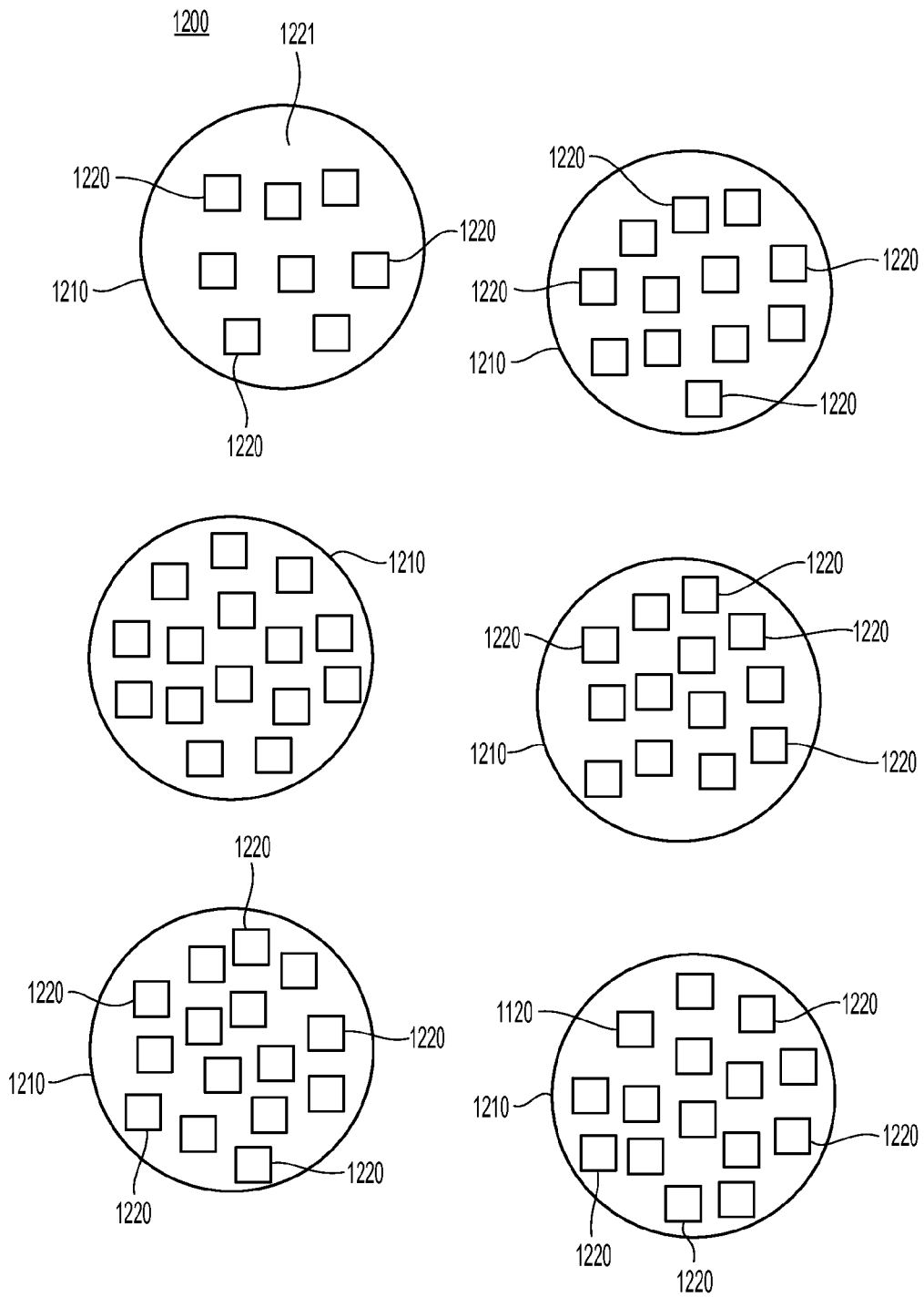
FIG. 12 is a representation of an embodiment of an instructional environment containing collections of display pieces for use in the system for teaching phonemic awareness of the present invention.

Referring to FIG. 12, an exemplary embodiment of an instructional environment 1200 for use with the system of the present invention is illustrated. The illustrated instructional environment is a fantasy gaming environment having the spatial context of a fictional universe containing a plurality of separate and independent worlds or planets 1210. Each planet 1210 includes a plurality of display pieces 1220 or playing cards. These include the full image display pieces and partial image display pieces as disclosed herein. Therefore, the spatial context includes a plurality of distinct display piece collections. Each display piece collection includes at least one and preferably a plurality of display pieces such that the entire plurality of sets of display pieces of the system for teaching phonemic awareness are contained within the display piece collections. The predefined rules of the instructional environment 1200 provide rules for moving between planets in the fictional universe, locating display pieces on each planet and assembling display pieces. Each planet can be provided in more detail, in particular in a computer-based application. Therefore, the entire universe can be illustrated as shown in FIG. 12. When a user, player or student selects a given planet, an expanded or more detailed view of the planet is illustrated, and the participant embarks on a quest through the planer world to locate the required display pieces. Clues and fictional characters or guides can be provided to assist the participant in the quest. Multiple independent participants can simultaneously participant in a single universe and planet to work together in joint quests. Other instructional environments can be chosen based on age appropriate spatial contexts or contexts with others themes, e.g., underwater themes or urban themes. These spatial contexts can also be provided in a physical game such as a card game or board game.

Within the instructional environment, each distinct display piece collection, e.g., each planet, represents a unique grouping of display pieces. In one embodiment, no single display piece is located in two different display piece collections. Display pieces can be divided among the different collections based on the phoneme or phonemes associated with those display pieces. For example, each distinct play piece collection includes display pieces having a common phoneme. Therefore, if a given phoneme is required, then the player must travel to the appropriate collection, i.e., planet, and locate the display piece from the appropriate set of display pieces. In this embodiment, in order to accumulate all of the display pieces in a given set of display pieces, the participant travels to a plurality of different display piece collections. Alternatively, display pieces of each given set of display pieces are all group together in one of the plurality of display piece collections. Therefore, all of the required display pieces for a given set are located, for example, on a single planet.

In one embodiment, each distinct display piece collection is associated with one of a plurality of syllable types. Each syllable type is a category of vowel sound associated with at least one syllable in one of the unique names associated with one of the graphical images. These syllable types include, but are not limited to, closed syllables, open syllables, vowel-consonant-E syllables, vowel team syllables, r-controlled syllables or consonant-le syllables. In one embodiment, each distinct playing piece collection includes all display pieces in a set of display pieces having an associated given name containing the syllable type associated with the category of vowel sound for that distinct playing piece collection.

In general, closed syllables have one vowel, followed by a consonant. The vowel has a short sound. Examples include am, cut, him, pot, track, and French. Multisyllable words can be made up of entirely closed syllables, such as the words admonish or plastic. An open syllable ends in a vowel and the vowel usually is long. Words containing open syllables include be, so, baby, and veto. Examples of open syllables combined with closed syllables include program and recess. In Vowel-Consonant-E (VCE) syllables or "Magic E syllables", there is a vowel followed by a consonant and silent "e". The silent "e" makes the vowel before it long. One syllable VCE words include make and smile. There are many multisyllable words containing the VCE syllable type, such as reptile and disclose. Vowel team syllables are sometimes referred to as "vowel pair syllables". In a vowel team syllable, two or more vowels come together to make one sound. Vowel teams are used in words like out or beach. Multisyllable words containing vowel team syllables include caution, loyal, and discount. R-Controlled Syllables can be called a "Bossy R syllable". In r-controlled syllable types, a vowel is followed by the letter r. The r "controls" the vowel, and gives it a different sound. Examples of r-controlled syllables include far, hurt, and sir. Consonant-le syllables are sometimes referred to as "final, stable syllables". Consonant-le syllables are normally found at the end of a word and contain a consonant followed by the letters le. Examples of words ending with this syllable type include turtle, middle, and table. Therefore, systems and methods in accordance with the present invention combine a knowledge of the basic phonograms and spelling rules with knowledge of the six syllable types, allowing the system user, player or student to become a strong reader and speller.

In one embodiment, the full image display pieces, e.g., the Phlash cards, which introduce the complete character, are spelled correctly. For example, Leaf is spelled correctly on the Phlash card, but may be spelled Leef, in which the partial image display piece for "ee" is derived from the set of display pieces associated with the graphical image and unique name Queen, when overlapping the partial image display pieces, e.g., Morph cards. Therefore, systems and methods in accordance with the present invention teach phonics and phonemic awareness and alternative words and nonsense words can be created and used in the teaching of phonics and phonemic awareness. Any words including nonsense words may be created, and these created words become the unique names associated with the graphical images. Overall spelling is improved as the player, student or user of the system learns what letters make what sounds. In addition, correct spellings of the words will also have to be learned.

In one embodiment, the individual display pieces, collections of display pieces, the spatial contexts containing these collections have a common colored theme to enhance association. For example, one of the planets is the closed vowel planet 1221 and is colored green. All of the graphical images associated with that planet are also colored green, e.g., green aliens, or appear on a green background within the display piece. In addition, the graphemes expressing this vowel can also be printed in green. Therefore, the vowel matches the alien color and the planet. Different colors can be used for all other planets associated with other vowels or syllable types. Some planets can contain more than one syllable type. For example, both the silent "e" syllable and vowel combined syllable planet can be blue, with blue aliens and blue vowels, in keeping with a water theme.

In one embodiment, all consonants appear in black. If a letter is black, its sound is pronounced. Therefore, if a display piece includes a consonant blend in a character named "Slim" for example, the user or student voices the pronunciation of both letters "S" and "l". Different coloring or graphics can be used to introduce a digraph, for example /sh/. These two letters have the same coloring that is a color other than black. In one embodiment, the vowel combined diphthongs, for example, /oi/ and /ow/, appear in the same long vowel planet. The graphical image of the creature is in blue and the letters of the diphthongs would also be in blue. The background of these letters or graphemes and background of the graphical image of the creature, however, is changed to a different color, for example yellow. These diphthongs make their own unique sound that simply has to be memorized. So, another character that would fit within my syllable formula could be /clown/ or /coin/.

In one embodiment, all vowels, other than silent /e/, appear in the second section of the display piece. Silent "e" appears in the fourth section as can, consonant-le, /y/, /er/, tion, and other suffixes. As was discussed above, exemplary embodiments in accordance with the present invention make any sound that is not a basic consonant sound, short vowel, long vowel or r-controlled sound the same unique color, e.g., gold or silver. These letters or graphemes serve as the reminder to the pronunciation and eliminate the need for dozens of separate color codings that have the potential of adding needless complexity and confusion. Preferably, the character color is determined by the vowel in the second section. Therefore, there are only three possible letter or grapheme colors, for example, blue (long vowel), green (short vowel) red (r-controlled), and possibly gold for any sound that is not a basic consonant sound, short vowel, long vowel or r-controlled sound such as /oi/ in Coin or /ow/ in Clown (in a given unique name).

In one embodiment, one of the display piece collections is a planet for R-controlled syllables. These letters have their own unique color that matches the color of the graphical image or aliens associated with that planet. No simple mnemonics exist for these as they each make a unique sound that simply has to me memorized, for example /er, ur, ir/ and /an/ and/or/. Suitable character unique names include, but are not limited to /Surf/ or /Sport/ or /Shirt/./Shirt/ has the /sh/ digraph located at the beginning of the unique name. In addition, the short vowel display piece collection planet has vowels that make their own unique sound. The distinctive coloring of the aliens and the matching vowels indicate syllable type.

In one embodiment, the display pieces are arranged as playing cards and contain printing on both sides of the card. In another embodiment, the cards are only printed on one side. In one embodiment, the full image display pieces are referred to as Treasure Cards or Phlash Cards. These cards illustrate or flash the complete treasure or Funny Mixer Friend that the user or student is trying to accumulate. The partial image display pieces are referred to as Morph Cards, indicating how these cards are used or accumulated within the context of the game utilizing the system of the present invention. An additional set of display pieces can contain modified versions of the graphical images on the full image and partial image display cards. In one embodiment, these display pieces are referred to as the Morph Cards. The Morph Cards include identical numbering and coloring with the Phlash Cards. The Morph Cards are obtained, however, when a complete set of partial image display pieces are accumulated and grouped together properly. Therefore, the user or student receives a prescribed reward that includes an additional power or powers associated with the graphical image for use with the instructional environment of the system. Therefore, the Morph Cards contain additional graphics indicating these new or evolved powers. Suitable graphics include, for example, a cape and mask to indicate that the graphical images are now in a super power form.

The user or student receives the satisfaction of turning graphical images into a super hero or an evolved character by either placing the matching Morph Cards on top of the Phlash Card or next to it. The graphemes on the Morph Cards align with and overlap the graphemes on the Phlash Cards. In one embodiment, each Morph Card is a transparent card that only includes the unique name aligned with the unique name of its corresponding Phlash Card and all of the graphics that are overlaid on the graphical image of the Phlash Card, cape, mask, mustache, wings, helmet, etc., in order to indicate the super power status. In a computer-based application, the display pieces or graphical images are morphed or changed as powers are earned or characters evolve. In one embodiment, portions of the graphical images can change. For example, capes and masks can change colors as points are earned or powers are accumulated.

Exemplary embodiments of systems and methods for teaching phonemic awareness in accordance with the present invention can take the form of stories, movies, games and game shows. In one embodiment, each character associated with a graphical image is associated with a distinct story that is expressed, for example, in a book or novel. Additional products can be provided that enhance the experience of the present invention. These additional products include, but are not limited to, toys, finger puppets and stuffed animals or plush toys.

In one exemplary embodiment of a system for teaching phonemic awareness in accordance with the present invention, the system is arranged as a multi-player game, called the Universe of Funny Mixers, that includes all twenty six letters of the English alphabet plus short vowels, longs vowels and one or more vowel combinations. In describing the games, Funny Mixer Friends refers to the unique names associated with the graphical images or characters. Phlash Friends or Cards refers to the full image display pieces, and Matching Morph Friends or Cards refers to the partial image display cards. In one embodiment, three Matching Morph Friends combine to correspond to one Phlash Friend. Funny Mixed Morph Friends or Cards refers to partial image display pieces that can be combined to create a mixed Super Funny Mixer, having, for example, two or three different Super Powers within the context of the game.

The game descriptions include three categories of games. The first category is Funny Mix Card Games. The second category is Funny Mix Board Games. These board games are configured to the standard six-sided die or unique die such as a six-sided or multi-side die having different colors on each face of the die. The third category of games is the Funny Mix Electronic Games, configured to operate on electronic devices and computers as described herein.

The Funny Mix Card Games are used to play games such as Go Fish, War, and Memory, among other games. In Matching games, the player begins with the Phlash Card numbered 1. The player transforms the Phlash Card into its Super Hero form by overlapping the associated Morph Cards one at a time. This introduces the Funny Mixer names and powers. Once characters and powers are introduced, this may be set up as a center for an independent activity. In one embodiment, the Matching game is played in a group of 2-4 players. Each player receives an equal number of Phlash Cards, and the players take turns picking Morph Cards out of a bag or from the instructor fanning the cards out. If a given Morph Card does not match one of the Phlash Cards in front of the player selecting that Morph Card, then the player returns the Morph Card to the bag or instructor. If the player picks a Morph Card that matches their Phlash Card, then they get another turn. The winner is the first player to complete their Phlash Cards with all three of the matching Morph Cards. When playing in a group setting, each player can give their selected Morph Card to the player who has the matching Phlash Card instead of returning it to the bag. This also helps each player to learn all of the Funny Mixer characters while encouraging teamwork. In one variation, all players become winners if the objective of the game is to help everybody match their corresponding Morph cards until all of the cards are matched.

The Go Morph games are a version of the classic game Go Fish. Only Morph Cards are used with the objective to obtain the most Morph Matches. If desired, a physical divider can be placed between each one of a plurality of players. Each player is initially dealt seven Morph Cards. The remaining Morph Cards are placed in a face-down pile. This is the Draw Pile. The first player, referring to their Morph Cards, asks one player at a time, "Do you have any (Character) Cards? The first player continues to ask this question to any player as long as each selected player passes them the requested chosen card(s). The player that does not possess the requested card(s) states, "Go Morph." The first player then selects the top card from the Draw Pile. If the card(s) that was asked for is selected, then that player gets another turn. The game continues in this manner until the Draw Pile is empty. At the conclusion of the game, the players count up the total number of Morph matches. The winner is the player with the most matches.

In another version of the Morph Game, the object is to obtain the most Morph Cards that form a complete Funny Mixed Morph Friend. All of the Morph Cards are dealt out to a plurality of players, for example from two to four players. Each player forms as many complete Funny Mixed Morph Friends as possible. The players count up their total number of complete Funny Mixed Morph Friends. The winner is the player with the most matches. In one variation, the players choose a winner based on the player who has the most Funny-Mixed Morph Friends without eyeballs, or with short vowels, long vowels, green letters, blue letters, etc. Another variation allows players to take turns selecting one Phlash Card from a fanned out deck. As each Phlash Card is selected the players check to see if any part of their Funny Mixed Morph Friends match the selected Phlash Friend. If so, they win. More than one player can win.

In a Funny Mix Games version of War, all of the Morph Cards are distributed equally among a plurality of players. The Phlash Cards are not needed. Each player lays down one card. The player with the card with the highest number is the winner and takes all of the other player's cards. If two or more players lay down cards having the same number, and that number is the highest number, then there is a War. These players each lay a card face-down on top of their cards. Then, each player lays one card face-up on the top. Whoever has the highest number on this last face-up card wins all three cards from each player that this War included. Multiple sequential wars are possible. The winner of the game is the player that has the most cards or that manages to accumulate all of the Morph Cards. In one variation, the dealer distributes all of the beginning, middle and end Morph Cards equally among the players, and the players construct as many complete Funny Mixed Morph Cards as they can. Each player lays down one complete Funny Mixed Morph Card. The players can then add up all three numbers on their complete card. The player with the highest number is the winner and takes all of the other player's cards. If players get the same highest number, then there is a War. The players each lay a Funny Mixed Morph card, face-down on top of their cards. Then, each player lays another Funny Mixed Morph Card face-up on the top. Whoever has the highest number wins all three cards from each player that this war included. Again, sequential wars are possible.

In a Memory Game, all of the Phlash Cards and the 3 matching Morph Cards are placed face down. Players take turns turning over one Phlash Card and the three Matching Morph Cards. The cards can have graphics on one side that indicate whether those cards are Phlash Cards or Morph Cards. If the cards match, then that player can keep all of the cards. Otherwise, all of the cards are turned back over. The player with the most matches at the end of the game wins. In one variation, the Phlash Cards are placed face down. Players each take turns selecting one card from a draw pile of face-down Morph Cards. This player then proceeds to try to turn over that matching Phlash Card character. Only one Morph Card from each of the three matching Morph friends is in the draw pile.

In the Game of Three Draw Piles, the objective is to collect the most Funny-Mixed Morph Friends. The three draw piles correspond to the three sections of the Morph Cards that include the beginning, middle, and end of the Morph Friends. However, each draw pile is separately and independently shuffled. On each round, every player takes a turn selecting one card from each pile in order to make a complete Funny Mixed Morph Friend. The dealer then fans out the Phlash Cards. Players take a turn to select one with each round. The players having the matching Morph Cards in any of their Funny Mixed Morph Friends can keep those three cards. The other Morph Cards get discarded. In one variation, each player keeps the Funny Mixed Morph Friends and has a chance at earning them with each round, as each Phlash Card is selected. When there are no longer enough Morph Cards in the three draw piles for each player to make a complete Funny-Mixed Morph Friend, then the game is over. The player with the most Funny Mixed Morph Friends is the winner.

Figure 13:
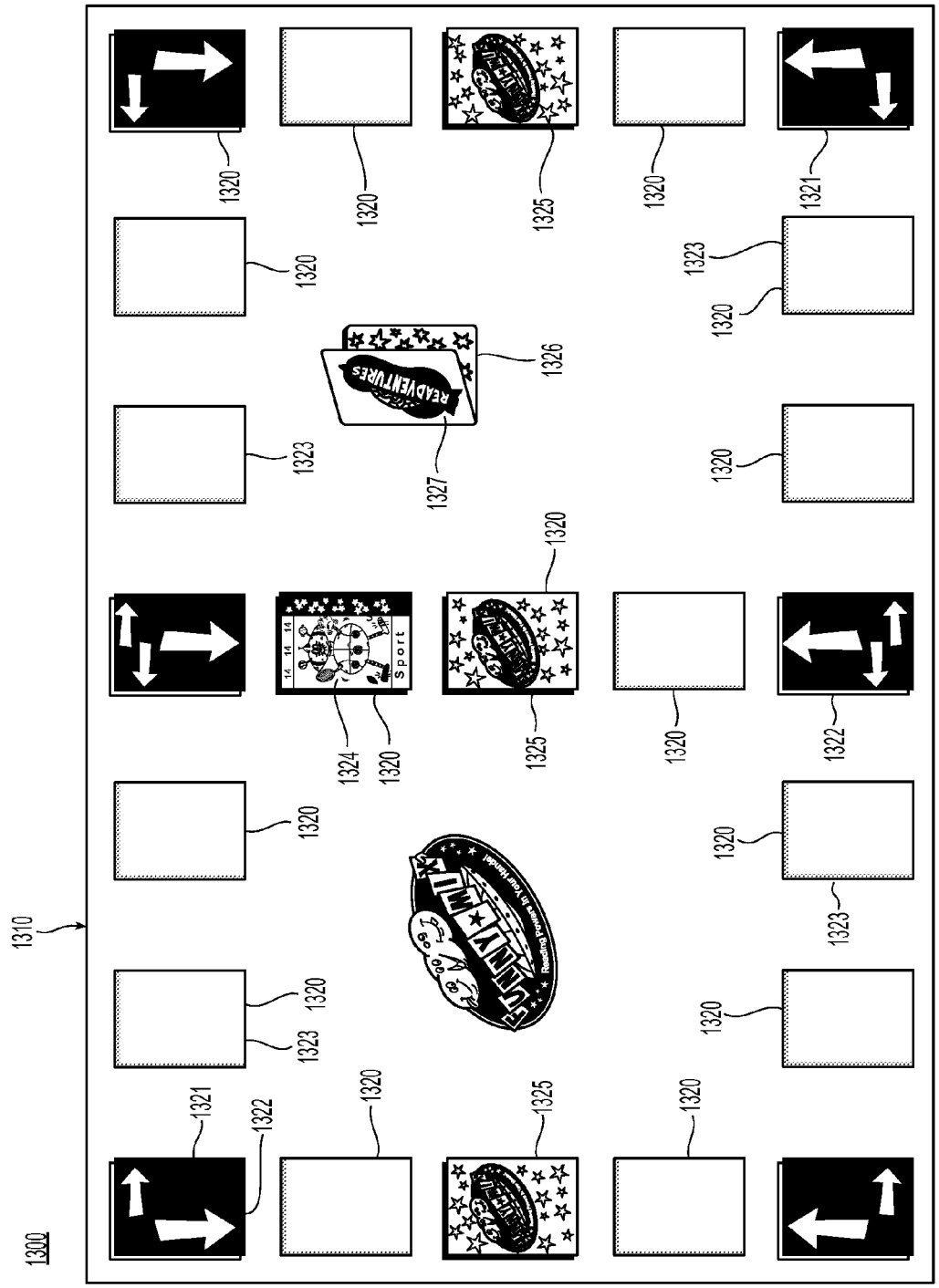
FIG. 13 is a view of an embodiment of a game board for use with the system for teaching phonemic awareness of the present invention.

Referring to FIG. 13, an embodiment of Funny Mix Board Game 1300 is illustrated. The Funny Mix Board Game 1300 utilizes a game board 1310 having a plurality of recessed spaces 1320 arranged in a desired pattern. These recessed spaces include one or more black spaces 1321 containing a plurality of arrows 1322 such as orange arrows that indicate the permitted direction of movement through the pattern of recessed spaces. A plurality of other recessed spaces 1323 can be colored with one or more desired colors such as blue, red, green, etc (The color of the Funny Mixer Friends). The recessed spaces are sized to accommodate the partial image or full images display pieces 1324. In one embodiment, each recessed space can accommodate the full image display piece and all of the partial image display pieces associated with a given graphical image within its recess. In one embodiment, both Phlash Cards and Morph Cards are placed in the recessed spaces. So the board game actually utilizes the deck of cards. Because of this, the game board can be changed with every game, or during games, if players wanted to change it up a little. In the Morph Card Lay Down game, the objective is to be the first player to lay down all of their Morph Cards on the corresponding Phlash Cards. This player is the winner.

In one embodiment, the game board includes a plurality of Funny-Mix spaces 1325. Phlash Cards are placed on any colored space of the game board except the three Funny Mix spaces and the Arrow spaces. The Morph Cards are then evenly distributed among the plurality of players. To help with locating their cards, players may want to overlap their matching Morph Card Friends together if they have any, and then lay them out so they can see all of their cards. Players select an arrow space to begin. This can be done strategically as to position their piece close to one of their corresponding Phlash Cards. Players take turns rolling the die on their turn. Players can move their piece any direction through the pattern of spaces, but must stay in that direction unless they land on an arrow space. At this point, the player can choose one of those directions to continue to proceed. This can be within the same play. When a player lands on a Phlash Card, they can place down one matching Morph card, if they have one. If a player lands on a Funny Mix spot 1325, then any Morph Card may be placed down, as long as the beginning, middle or end of the Funny Mix spot does not already have a Morph Card in that spot. To clarify, only three Morph Cards can be placed in the Funny Mix spot in order to create a Funny Mixed Morph character. The winner is the player that gets rid of all of their cards first.

The game board can also include one or more covered recesses 1326 that are not part of the desired pattern or path of the game. In one embodiment, the covered recess includes a printed star pattern background and a hinged cover 1327 to close the covered recess. This can be used to include a special card, mystery card or other prize that is awarded to a player as a result of game play. It can also hold extra cards or a draw pile of cards.

The Morph Card Pick-Up Game is the reverse of Morph Card Lay Down. All of the three matching Morph Cards are placed in each colored space on the board game. Cards are not placed on the Funny-Mix or arrow spaces. The dealer distributes the Phlash cards evenly among all players. Players can select a beginning arrow space. This can be done strategically as to position their piece close to one of their matching Morph Cards, i.e., matches one of the Phlash Cards in their possession. Players each take turns rolling the die. Players can move their piece any direction, but must stay in that direction unless they land on an arrow space. Then they can choose one of those directions to continue to proceed. This can be within the same play. When a player lands on Morph Cards, they can pick up one of the Morph Cards if they possess the matching Phlash Card. If a player lands on a Funny Mix spot, then they get to go again. The winner is the player that collects all of their corresponding Morph Cards first. In one variation, no Phlash Cards are needed. Players go around the board collecting any cards they need to make complete Funny Mixed Morph Friends. Matching Morph Friends also count. The player who makes the most complete Funny Mixed Morph Friends wins. There is a single unique space on the game board that has a cover that can conceal any cards placed inside. Therefore, players can select one or more Phlash Cards that are face-down, to hide in this space. At the end of this game, these Phlash Cards are revealed, and whoever has one or more of the Matching Morph cards is a winner. There can be multiple winners.

The Color Board Game uses a colored die having two green sides, two red sides and two blue sides. An additional color can be added (possibly gold or silver) as the colors correspond to the Funny Mixer color. (Of course, 1 other color would have to be removed from at least 1 side). The sides also include numbers, i.e., 1-6. The objective of the game is the same as the Morph Card Lay Down game but without the Phlash Cards. Morph Cards are evenly distributed among the plurality of players. The player who lays down all of their Morph Cards first is the winner. Players select an arrow space on which to begin. Players take turns rolling the die and may select to go to any space that has the matching color of their Morph Friend or they may count out the number of spaces as shown on the die. Players can move their piece any direction, but must stay in that direction unless they land on an arrow space. Then they can choose one of those directions to continue to proceed. This can be within the same play. When a player lands on a color space, they can place down a corresponding Morph Card if they have one. If a player lands on a Funny Mix spot, then any Morph Card may be placed down, as long as the beginning, middle or end of the Funny Mix spot does not already have a Morph Card in that position. To clarify, only three Morph Cards can be placed in the Funny Mix spot in order to create a complete Funny Mixed Morph Friend. Matching Morph Friends also count. The winner is the player that gets rid of all of their cards first.

In the Phlash Card Open Game, the objective is to earn the most points. Morph Cards count as one point each. Phlash Cards count as three points each. This is easy to remember as it takes three Morph Cards to equal one Phlash Card. Phlash Cards are placed on any colored space. Phlash Cards should not be placed in the three Funny Mix spaces or on the arrow spaces. The three Matching Morph Cards are then placed on top of each corresponding Phlash Card. Players take turns rolling the die on their turn. Players can move their piece any direction, but must stay in that direction unless they land on an arrow space. Then they can choose one of those directions to continue to proceed. This can be within the same play. When a player lands on a Morph Card(s), that player can pick up 1 Morph Card. If a player lands on a Funny Mix spot, then they get to go again. When all three Morph Cards have been collected and the underlying Phlash Card is exposed, the player needs to shout out, "(character) is open!" Then everyone gets excited to try and get that Phlash Card because it is worth three points. The players also continue picking up any Morph Card on their turn, even if they can't get to an open Phlash Card. The winner is the player that has the most points at the end of the game.

The Funny-Mix Electronic Games include the Funny Mix Board Game, Roulette Wheel Games and a Slot Machine Game. In the Funny Mix (Pseudo) Board Game, the Morph Cards are dealt out in an ordered path. The first player rolls the die and collects the Morph card on which they land. The cards can be reconfigured or mixed up so spaces are not left when a card is picked up. The winner is the player with the most complete Funny-Mixed Morph Friends. Players may have cards left over or not used. Matching Morph Friends also count. In one variation, each player can pick one or more Phlash Cards, without looking, to place in a Secret Box. The winners are the players possessing one or more of the matching Morph Cards when revealed at the end.

The Roulette Wheel Game uses a wheel containing equal numbers of the green, blue, red, and gold or silver Funny Mixer colors. Based on the color the wheel stops on, a player selects a Morph card from each of three draw piles that are separated, face-up, according to the color of the Funny Mixers Friends. The player constructing the most complete Funny Mixed Morph Friends with the same color characters is the winner. Matching Morph Friends also count. In an alternate Roulette Wheel Game, the wheel contains graphemes. The dealer deals out all of the Phlash Cards evenly among the players. The players take turns spinning the wheel and landing on a grapheme. If they have that particular letter in their Phlash Cards, they select that card from the Morph Cards that are placed face-up. The player that completes all of their Phlash Cards with the matching three Morph Cards first is the winner.

The Funny Mixers to the Rescue (Slot Machine Version) game has the objective of trying to select the appropriate cards that are spinning around a dial. As Funny-Mixer Morph cards are going around on a "dial", one card is selected from the beginning, middle and end of the Matching Morph Friend from either a pre-selected Phlash Card or just any Phlash Card. The Morph Cards can be arranged on the dial with the beginning, middle and ending in that particular order. Alternatively, one card from the beginning, middle and end of the Morph Cards that would combine to make a Funny Mixed Morph Friend or one card at a time with the necessary Super Power to solve a provided dilemma are selected. Dilemmas are provided so that one complete Funny Mixed Morph Friend can be created. Feedback will help the player select the correct Morph Card with more than one try available. As a result of selecting three correct Morph Friends to make one complete Funny Mixed Morph Friend, the character can then become animated and solve the three dilemmas as a reward. The same Funny Mixed Morph Friend, once created, can also solve other problems as rewards.

Systems and methods in accordance with the present invention utilize different techniques for securing letter identification and letter sound recognition. Users of the system can simply learn each character's name while overlapping the Phlash Card with the three Matching Morph Cards. The Super Powers can also be introduced. Beginning with the character, Zip, letter identification is taught beginning with the name of each letter. Users may also trace the letter and say its name and sound in a sand/salt tray. The users can be taught to blend each sound together while overlapping the three corresponding Morph Cards, in order, from left-to-right, while continuing to learn how to read each Phlash Friend using this formula. The instructor can then assess if the user or student can decode each sound as the Morph Friends are overlapped together to create Funny Mixed Morph Friends as in The Morph Game.

The present invention is also directed to a computer readable medium containing a computer executable code that when read by a computer causes the computer to perform a method for teaching phonemic awareness in accordance with the present invention and to the computer executable code itself. The computer executable code can be stored on any suitable storage medium or database, including databases in communication with and accessible by the control mechanism performing the method in accordance with the present invention. In addition, the computer executable code can be executed on any suitable hardware platform as are known and available in the art.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A system for teaching phonemic awareness, the system comprising:
    a plurality of phonemes, each phoneme comprising a unique sound and an indivisible unit of sound in a spoken language;
    a plurality of graphemes, each grapheme comprising a written representation of one of the plurality of phonemes;
    a plurality of distinct graphical images;
    a plurality of unique names:
        each unique name associated with only one of the graphical images;
        each graphical image associated with only one of the unique names: and
        each unique name comprising a unique grouping of multiple graphemes selected from the plurality of graphemes;
    a plurality of sets of display pieces, each set of display pieces comprising:
        one of the graphical images and the unique name associated with that graphical image; and
        a plurality of individual display pieces and each individual display piece comprising;
            at least a portion of the graphical image associated with the set of display pieces; and
            one or more graphemes from the unique grouping of multiple graphemes constituting the unique name associated with that graphical image;
        wherein each grapheme and its associated phoneme is separately represented within any given individual display piece; and
    a predefined instructional environment, the instructional environment comprising a predefined spatial context and predefined rules governing acquisition, dispersement and utilization of individual display pieces within the predefined spatial context.

2. The system of claim 1, wherein the plurality of phonemes comprises about forty four phonemes.

3. The system of claim 1, wherein at least two of the plurality of graphemes in combination comprise a written representation of a single phoneme.

4. The system of claim 1, wherein at least one of the plurality of phonemes is represented separately by at least two of the plurality of graphemes.

5. The system of claim 1, wherein the pre-defined instructional environment comprises a gaming environment and each graphical image comprises a fictional character within the gaming environment, the gaming environment comprising the predefined rules governing fictional character creation, fictional character acquisition, fictional character utilization, fictional character interactions and fictional character disposition within the predefined spatial context of the gaming environment.

6. The system of claim 5, wherein each fictional character comprises at least one unique functionality expressed within the predefined rules of the gaming environment.

7. The system of claim 1, wherein each unique name comprises a single syllable word.

8. The system of claim 1, wherein at least one unique name comprises a multisyllabic word.

9. The system of claim 1, wherein each individual display piece in a given set of display pieces comprises an alphanumeric designation that is common to all display pieces within that set of display pieces.

10. The system of claim 9, wherein the alpha-numeric designations associated with the sets of display pieces comprise an ordered sequence.

11. The system of claim 1, wherein each portion of one of the graphical images on each individual display piece within a given set of display pieces comprises an additional graphical representation of the unique name associated with that graphical image.

12. The system of claim 1, wherein each individual display piece comprises one or more predefined visual indicators selected to provide a visual association to the phonemes associated with the graphemes appearing on that individual display piece.

13. The system of claim 12, wherein the visual indicators comprise graphics, unique colors, alpha-numeric characters or combinations thereof 14. The system of claim 1, wherein each individual grapheme comprises one or more predefined visual indicators selected to provide a visual association of the phonemes associated with those graphemes.

15. The system of claim 14, wherein the visual indicators comprise graphics, unique colors or combinations thereof.

16. The system of claim 1, wherein each set of display pieces comprises a set of game pieces comprising a plurality of individual game pieces.

17. The system of claim 16, wherein each individual game piece comprises a playing card.

18. The system of claim 1, wherein each individual display piece comprises a partial image display piece, each partial image display piece comprising a portion of the one graphical image associated with the set of display pieces containing that individual display piece and at least one of the graphemes constituting the unique name associated with that graphical image.

19. The system of claim 18, wherein each partial image display piece comprises exactly one grapheme.

20. The system of claim 18, wherein each partial image display piece comprises a unique portion of the graphical image.

21. The system of claim 18, wherein all partial image display pieces within the set of display pieces are configured to form the one graphical image and unique name when grouped together.

22. The system of claim 18, wherein each partial image display piece comprises a playing card having an opaque section comprising its portion of the one graphical image and graphemes.

23. The system of claim 22, wherein each partial image display piece comprises a transparent section, all partial image display pieces within the given set of display pieces configured such that the opaque section of each partial image display piece aligns with the transparent section of all other partial image display pieces when the partial image display pieces are grouped together in any order.

24. The system of claim 18, wherein all partial image display pieces comprise an additional opaque section, all of the additional opaque sections comprising an identical section.

25. The system of claim 24, wherein the additional opaque section comprises a black section.

26. The system of claim 24, wherein all additional opaque sections align when the partial image display pieces are grouped together.

27. The system of claim 1, wherein each set of display pieces comprises a single full image display piece, each full image display piece comprising a complete representation of the one graphical image associated with that set of display pieces and all graphemes constituting the unique name associated with the one graphical image.

28. The system of claim 27, wherein each full image display piece comprises a plurality of sections, each section comprising a unique portion of the one graphical image associated with that set of display pieces and at least one of the graphemes constituting the unique name associated with that one graphical image.

29. The system of claim 28, wherein each section comprises exactly one grapheme.

30. The system of claim 1, wherein the spatial context comprises a plurality of distinct display piece collections, each display piece collection comprising a plurality of individual display pieces such that the entire plurality of sets of display pieces are contained within the plurality of display piece collections, and wherein the predefined rules comprise rules for acquisition of the display pieces from the distinct display piece collections.

31. The system of claim 30, wherein the spatial context comprises a fictional universe, the plurality of distinct display piece collections comprises a plurality of planets in the fictional universe and the predefined rules comprise rules for moving between planets in the fictional universe, locating individual display pieces on each planet and assembling individual display pieces into the sets of display pieces.

32. The system of claim 31, wherein the individual display pieces comprise individual playing cards.

33. The system of claim 30, wherein each distinct display piece collection comprises a unique grouping of individual display pieces.

34. The system of claim 30, wherein each distinct play piece collection comprises individual display pieces comprising a common phoneme.

35. The system of claim 30, wherein individual display pieces of each given set of display pieces are all grouped together in one of the plurality of display piece collections.

36. The system of claim 30, wherein each distinct display piece collection is associated with one of a plurality of syllable types, each syllable type comprising a category of vowel sound associated with at least one syllable in one of the unique names associated with one of the graphical images.

37. The system of claim 36, wherein each distinct playing piece collection comprises all display pieces in a set of display pieces having an associated given name containing the syllable type associated with the category of vowel sound for that distinct playing piece collection.

38. The system of claim 36, wherein the syllable types comprise closed syllables, open syllables, vowel-consonant-E syllables, vowel team syllables, r-controlled syllables or consonant-le syllables.

* * * * *